(12) United States Patent
Da et al.

(10) Patent No.: US 12,055,648 B2
(45) Date of Patent: Aug. 6, 2024

(54) METHOD AND DEVICE FOR DETERMINING INFORMATION

(71) Applicant: DATANG MOBILE COMMUNICATIONS EQUIPMENT CO., LTD., Beijing (CN)

(72) Inventors: Ren Da, Beijing (CN); Bin Ren, Beijing (CN); Gang Li, Beijing (CN); Shaohui Sun, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 318 days.

(21) Appl. No.: 17/613,728

(22) PCT Filed: May 14, 2020

(86) PCT No.: PCT/CN2020/090314
§ 371 (c)(1),
(2) Date: Nov. 23, 2021

(87) PCT Pub. No.: WO2020/238639
PCT Pub. Date: Dec. 3, 2020

(65) Prior Publication Data
US 2022/0236362 A1  Jul. 28, 2022

(30) Foreign Application Priority Data
May 24, 2019 (CN) .......................... 201910441987.3

(51) Int. Cl.
*G01S 5/02* (2010.01)
*H04L 27/26* (2006.01)
*H04W 24/10* (2009.01)

(52) U.S. Cl.
CPC .......... *G01S 5/0246* (2020.05); *H04L 27/261* (2013.01); *H04W 24/10* (2013.01)

(58) Field of Classification Search
CPC . G01S 5/0246; H04L 27/261; H04L 27/2657; H04L 27/2675; H04L 27/2602; H04W 24/10; H04W 64/00; H04W 4/02
See application file for complete search history.

(56) References Cited

U.S. PATENT DOCUMENTS

| | | |
|---|---|---|
| 5,825,326 A | 10/1998 | Semler et al. |
| 6,268,824 B1 | 7/2001 | Zhodzishky et al. |

(Continued)

FOREIGN PATENT DOCUMENTS

| | | |
|---|---|---|
| CN | 102141627 A | 8/2011 |
| CN | 103068012 A | 4/2013 |

(Continued)

OTHER PUBLICATIONS

CATT, "NR RAT-dependent DL Positioning," 3GPP TSG RAN WG1 Ad-Hoc Meeting 1901, R1-1900310, Taipei, Jan. 21-25, 2019.

(Continued)

*Primary Examiner* — Nader Bolourchi
(74) *Attorney, Agent, or Firm* — Meunier Carlin & Curfman LLC

(57) ABSTRACT

The present application discloses a method and device for determining information, which are used to implement terminal positioning based on carrier signal phase measurement values and improve terminal positioning accuracy. The method for determining information provided by the present application includes: receiving the carrier signal discontinuously sent by the network side; determining the carrier signal phase measurement value for positioning the terminal based on the carrier signal discontinuously sent by the network side.

15 Claims, 7 Drawing Sheets

```
┌─────────────────────────────────────────────┐         S101
│ Receiving carrier signals discontinuously   │  ∼∼
│           sent by the network side          │
└─────────────────────────────────────────────┘
                      │
                      ▼
┌─────────────────────────────────────────────┐         S102
│ Determining carrier signal phase measurement│  ∼∼
│ values for positioning a terminal based on  │
│ the carrier signals discontinuously sent by │
│             the network side                │
└─────────────────────────────────────────────┘
```

(56) References Cited

U.S. PATENT DOCUMENTS

| | | | |
|---|---|---|---|
| 6,313,789 B1 | 11/2001 | Zhodzishsky et al. | |
| 2010/0136903 A1* | 6/2010 | Lee .................. | H04L 25/03343 |
| | | | 455/17 |
| 2015/0042511 A1 | 2/2015 | Miller et al. | |
| 2018/0128910 A1 | 5/2018 | Lee et al. | |

FOREIGN PATENT DOCUMENTS

| | | | |
|---|---|---|---|
| CN | 103630915 A | 3/2014 | |
| CN | 104297761 A | 1/2015 | |
| CN | 104749591 A | 7/2015 | |
| CN | 108318905 A | 7/2018 | |
| CN | 110062457 A | 7/2019 | |
| CN | 110972054 A | 4/2020 | |
| WO | 2019141090 A1 | 7/2019 | |

OTHER PUBLICATIONS

CATT, "Further discussion of NR RAT-dependent DL Positioning," 3GPP TSG RAN WG1 Meeting#96, R1-1901980, Athens, Greece, Feb. 25-Mar. 1, 2019.
CATT, "Network synchronization based on RAT-dependent signals," 3GPP TSG RAN WG1 Meeting#97, R1-1906309, Reno, USA, May 13-17, 2019.
Wang et al., A Kind of positioning method based on subcarrier phase difference in cellular system, The 9th China Satellite Navigation Conference, May 23, 2017, English Abstract.

* cited by examiner

METHOD AND DEVICE FOR DETERMINING INFORMATION

CROSS-REFERENCE OF RELATED APPLICATIONS

The present application is a National Stage of International Application No. PCT/CN2020/090314, filed on May 14, 2020, which claims the priority from Chinese Patent Application No. 201910441987.3, filed with the Chinese Patent Office on May 24, 2019 and entitled "Method and Device for Determining Information", both of which are hereby incorporated by reference in their entirities.

FIELD OF INVENTION

The present application relates to the field of communication technologies, and particularly to a method and device for determining information.

BACKGROUND

Various User Equipment (UE) positioning methods have been defined in the 3GPP, including Observed Time Difference Of Arrival (OTDOA) positioning method, Enhanced-Cell IDentification (E-CID) positioning method, and Uplink Observed Time Difference Of Arrival (UTDOA) positioning method, etc. The main advantage of these methods is: the UE position can be determined by measuring the reference signal of the wireless communication network itself, and the operations can be performed in environments where the reference signals (for example, satellite signals of the Global Navigation Satellite System, outside the network cannot be received. However, the common problem of these positioning methods is: the positioning accuracy is low, and it is difficult to achieve the high-precision positioning requirement that 5G wireless communication systems should support.

BRIEF SUMMARY

The embodiments of the present application provide a method and device for determining information, so as to implement the terminal positioning based on the carrier signal phase measurement value and improve the terminal positioning accuracy.

On the terminal side, a method for determining information provided by an embodiment of the present application includes:

receiving carrier signals discontinuously sent by a network side;

determining carrier signal phase measurement values for positioning a terminal based on the carrier signals discontinuously sent by the network side.

Through this method, the carrier signal phase measurement values for positioning the terminal are determined based on the carrier signals discontinuously sent by the network side, thereby realizing the determination of the carrier signal phase measurement values for positioning the terminal based on the carrier signals discontinuously sent by the network side, so that the network side can position the terminal based on the carrier signal phase measurement values after the terminal reports the carrier signal phase measurement values to the network side, improving the positioning accuracy.

Optionally, the determining carrier signal phase measurement values for positioning a terminal based on the carrier signals discontinuously sent by the network side, includes:

obtaining first carrier signal phase measurement values based on the carrier signals discontinuously sent by the network side through carrier signal phase-locked loop;

deriving second carrier signal phase measurement values for positioning the terminal from the first carrier signal phase measurement values.

Optionally, the first carrier signal phase measurement values include $\{\theta_0^m, \theta_1^m, \theta_2^m, \ldots\}$; where $\theta_i^m$ represents a first carrier signal phase measurement value at time $t_i$;

the second carrier signal phase measurement values include $\{\theta_0, \theta_1, \theta_2, \ldots\}$, where $\theta_i$ represents a second carrier signal phase measurement value at time $t_i$.

Optionally, in response to a phase change of carrier signals transmitted in a predefined first time interval being less than a preset value, $\{\theta_0, \theta_1, \theta_2, \ldots\}$ is derived from $\{\theta_0^m, \theta_1^m, \theta_2^m, \ldots\}$ by using interpolation and modulo algorithms.

Optionally, the preset value is 0.5 carrier signal transmission cycle, and corresponds to a carrier phase change value pi.

Optionally, the predefined first time interval refers to a time interval from a moment when a carrier phase measurement value is obtained before phase lock of the phase-locked loop is lost to a moment when the phase-locked loop re-locks carrier signals after the phase lock is lost and a carrier phase measurement value is obtained, where a maximum value of the predefined first time interval is a sum of an uplink data transmission cycle and a downlink data transmission cycle, and a minimum value of the predefined first time interval is the uplink data transmission cycle.

Optionally, $\{\theta_0, \theta_1, \theta_2, \ldots\}$ is derived using a formula of:

$$\theta_0 = \theta_0^m$$

$$\theta_{i+1} = \theta_i + \delta_i (i = 0, 1, \ldots)$$

$$\delta_i = \begin{cases} (\theta_{i+1}^m - \theta_i^m), & \text{if } |(\theta_{i+1}^m - \theta_i^m)| < \pi \\ (\theta_{i+1}^m - \theta_i^m) - 2\pi, & \text{if } (\theta_{i+1}^m - \theta_i^m) > \pi \\ (\theta_{i+1}^m - \theta_i^m) + 2\pi, & \text{if } (\theta_{i+1}^m - \theta_i^m) < -\pi \end{cases}$$

Optionally, in response to a phase change of carrier signals transmitted in a predefined first time interval being greater than or equal to a preset value, deriving second carrier signal phase measurement values for positioning the terminal from the first carrier signal phase measurement values, includes:

determining carrier signal phase predicted values in a target uplink data transmission cycle by using a change rate of a plurality of first carrier signal phase measurement values in a same downlink data transmission cycle and first carrier signal phase measurement values in a previous downlink data transmission cycle of the target uplink data transmission cycle, and determining the second carrier signal phase measurement values for positioning the terminal according to the carrier signal phase predicted values.

Optionally, the plurality of first carrier signal phase measurement values include: carrier signal phase measurement values obtained by Downlink (DL) Positioning Reference Signals (PRSs) sent on one or more DL Orthogonal Frequency Division Multiplexing (OFDM) symbols with exceeding a preset bandwidth and a preset power, and carrier signal phase measurement values obtained by Carrier phase- Positioning Reference Signals (C-PRSs) sent on other OFDM symbols in a same downlink transmission cycle;

or the plurality of first carrier signal phase measurement values include: a plurality of carrier signal phase measurement values obtained by DL PRSs sent on DL OFDMs with exceeding a preset bandwidth and a preset power many times in a same downlink transmission cycle at a preset second time interval.

Optionally, a phase change of carrier signals transmitted in the preset second time interval is less than 0.5 carrier signal transmission cycle, and corresponds to a carrier phase change value pi.

Optionally, in response to that two first carrier signal phase measurement values measured in a same downlink data transmission cycle being $\{\theta_{2i}{}^m, \theta_{2i+1}{}^m\}$, a time interval between $\{\theta_{2i}{}^m, \theta_{2i+1}{}^m\}$ being $\delta_1$, two first carrier signal phase measurement values measured at two time points $\{t_{2i+1}, t_{2i+2}\}$ across the uplink data transmission cycle being $\{\theta_{2i+1}{}^m, \theta_{2i+2}{}^m\}$, and a time interval between $\{\theta_{2i+1}{}^m, \theta_{2i+2}{}^m\}$ being $\delta_2$, where i=0, 1, 2, . . . , the second carrier signal phase measurement values for positioning the terminal are specifically determined by an interpolation algorithm.

Optionally, the determining the second carrier signal phase measurement values for positioning the terminal by an interpolation algorithm, includes:

determining a change rate of $\{\theta_{2i}{}^m, \theta_{2i+1}{}^m\}$ as $(\theta_{2i+1}{}^m - \theta_{2i}{}^m)/\delta_1$;

determining a change rate of $\{\theta_{2i+1}{}^m, \theta_{2i+2}{}^m\}$ as:

$$\dot{\theta}_{2i} \approx ([(\theta_{2i+3}{}^m - \theta_{2i+2}{}^m) + (\theta_{2i+1}{}^m - \theta_{2i}{}^m)]/2\delta_1$$
$$(i=0,1,2,\ldots)\};$$

satisfying $\theta_0 = \theta_0{}^m$; $\theta_1 = \theta_1{}^m$;

calculating carrier signal phase predicted values $\hat{\theta}_{2i+2}$ based on $\theta_{2i+1}{}^m$ and the change rate $\dot{\theta}_{2i}$ by a formula of:

$$\hat{\theta}_{2i+2} = (\theta_{2i+1}{}^m + \dot{\theta}_{2i} * \delta_2);$$

determining the second carrier signal phase measurement values $\theta_{2i+2}$ by a formula of:

$$\theta_{2i+2} = \begin{cases} \theta^m_{2i+2} + 2n\pi, & \text{if } \left|\theta^m_{2i+2} - \text{mod}(\hat{\theta}_{2i+2}, 2\pi)\right| < \pi \\ \theta^m_{2i+2} + 2(n-1)\pi, & \text{if } [\theta^m_{2i+2} - \text{mod}(\hat{\theta}_{2i+2}, 2\pi)] > \pi \\ \theta^m_{2i+2} + 2(n+1)\pi, & \text{if } [\theta^m_{2i+2} - \text{mod}(\hat{\theta}_{2i+2}, 2\pi)] < -\pi \end{cases}$$

where $n = \lfloor \hat{\theta}_{2i+2}/2\pi \rfloor$ represents a whole period part of $\hat{\theta}_{2i+2}$, and $\lfloor . \rfloor$ represents rounding up, i=0, 1, 2, . . . ;

determining the second carrier signal phase measurement values $\theta_{2i+1}$ by a formula of:

$$\theta_{2i+1} = \theta_{2i} + (\theta_{2i+1}{}^m - \theta_{2i}{}^m) \ (i=1,2,3,\ldots).$$

Optionally, determining whether the phase change of the carrier signals transmitted in the predefined first time interval is less than the preset value in one of the following ways:

in a first way: reporting an accuracy of a crystal oscillator of a terminal receiver and a Doppler frequency of the terminal so that the network side judges whether the phase change of the carrier signals transmitted in the predefined first time interval is less than the preset value according to the accuracy of a crystal oscillator of a base station transmitter as well as the accuracy of the crystal oscillator of the terminal receiver and the Doppler frequency of the terminal reported by the terminal, and receiving indication information on whether the phase change of the carrier signals transmitted in the predefined first time interval is less than the preset value sent by the network side;

in a second way: receiving the accuracy of a crystal oscillator of a base station transmitter provided by the network side, and judging whether the phase change of the carrier signals transmitted in the predefined first time interval is less than the preset value according to the accuracy of the crystal oscillator of the base station transmitter as well as the accuracy of a crystal oscillator of a terminal receiver and a Doppler frequency of the terminal.

On the network side, a method for determining information provided by an embodiment of the present application includes:

obtaining carrier signal phase measurement values reported by a terminal, where the carrier signal phase measurement values are determined by the terminal based on carrier signals discontinuously sent by a network side;

determining positioning information of the terminal according to the carrier signal phase measurement values.

Optionally, before the obtaining the carrier signal phase measurement values reported by the terminal, the method further includes:

receiving an accuracy of a crystal oscillator of a terminal receiver and a Doppler frequency of the terminal; determining whether a phase change of carrier signals transmitted in a predefined first time interval is less than a preset value according to an accuracy of a crystal oscillator of a base station transmitter and the accuracy of the crystal oscillator of the terminal receiver and the Doppler frequency of the terminal, and sending indication information on whether the phase change of the carrier signals transmitted in the predefined first time interval is less than the preset value to the terminal;

or, sending an accuracy of the crystal oscillator of the base station transmitter to the terminal.

Optionally, the discontinuously sent carrier signals include: DL PRSs sent on one or more DL OFDM symbols with exceeding a preset bandwidth and a preset power.

Optionally, carrier signals sent discontinuously in a same downlink data transmission cycle include:

DL PRSs sent on one or more DL OFDM symbols with exceeding a preset bandwidth and a preset power, and C-PRSs;

or DL PRSs sent on DL OFDMs with exceeding the preset bandwidth and preset power many times in the same downlink transmission cycle at a preset second time interval.

Optionally, a phase change of carrier signals transmitted in the preset second time interval is less than 0.5 carrier signal transmission cycle, and corresponds to a carrier phase change value pi.

On the terminal side, a device for determining information provided by an embodiment of the present application includes:

a memory configured to store program instructions;

a processor configured to read the memory to execute the program instructions to perform followings:

receiving carrier signals discontinuously sent by a network side;

determining carrier signal phase measurement values for positioning a terminal based on the carrier signals discontinuously sent by the network side.

Optionally, the determining carrier signal phase measurement values for positioning a terminal based on the carrier signals discontinuously sent by the network side, includes:

obtaining first carrier signal phase measurement values based on the carrier signals discontinuously sent by the network side through carrier signal phase-locked loop;

deriving second carrier signal phase measurement values for positioning the terminal from the first carrier signal phase measurement values.

Optionally, the first carrier signal phase measurement values include $\{\theta_0^m, \theta_1^m, \theta_2^m, \ldots\}$; where $\theta_i^m$ represents a first carrier signal phase measurement value at time $t_i$;

the second carrier signal phase measurement values include $\{\theta_0, \theta_1, \theta_2, \ldots\}$, where $\theta_i$ represents a second carrier signal phase measurement value at time $t_i$.

Optionally, in response to a phase change of carrier signals transmitted in a predefined first time interval being less than a preset value, the processor is configured to derive $\{\theta_0, \theta_1, \theta_2, \ldots\}$ from $\{\theta_0^m, \theta_1^m, \theta_2^m, \ldots\}$ by using interpolation and modulo algorithms.

Optionally, the preset value is 0.5 carrier signal transmission cycle, and corresponds to a carrier phase change value pi.

Optionally, the predefined first time interval refers to a time interval from a moment when a carrier phase measurement value is obtained before phase lock of the phase-locked loop is lost to a moment when the phase-locked loop re-locks carrier signals after the phase lock is lost and a carrier phase measurement value is obtained, where a maximum value of the predefined first time interval is a sum of an uplink data transmission cycle and a downlink data transmission cycle, and a minimum value of the predefined first time interval is the uplink data transmission cycle.

Optionally, the processor specifically derives $\{\theta_0, \theta_1, \theta_2, \ldots\}$ using a formula of:

$$\theta_0 = \theta_0^m$$

$$\theta_{i+1} = \theta_i + \delta_i (i = 0, 1, \ldots)$$

$$\delta_i = \begin{cases} (\theta_{i+1}^m - \theta_i^m), & \text{if } |(\theta_{i+1}^m - \theta_i^m)| < \pi \\ (\theta_{i+1}^m - \theta_i^m) - 2\pi, & \text{if } (\theta_{i+1}^m - \theta_i^m) > \pi \\ (\theta_{i+1}^m - \theta_i^m) + 2\pi, & \text{if } (\theta_{i+1}^m - \theta_i^m) < -\pi \end{cases}$$

Optionally, in response to a phase change of carrier signals transmitted in an uplink data transmission cycle being greater than or equal to a preset value, deriving second carrier signal phase measurement values for positioning the terminal from the first carrier signal phase measurement values, includes:

determining carrier signal phase predicted values in a target uplink data transmission cycle by using a change rate of a plurality of first carrier signal phase measurement values in a same downlink data transmission cycle and first carrier signal phase measurement values in a previous downlink data transmission cycle of the target uplink data transmission cycle, and determining the second carrier signal phase measurement values for positioning the terminal according to the carrier signal phase predicted values.

Optionally, the plurality of first carrier signal phase measurement values include: carrier signal phase measurement values obtained by DL PRSs sent on one or more DL OFDM symbols with exceeding a preset bandwidth and a preset power, and carrier signal phase measurement values obtained by C-PRSs sent on other OFDM symbols in a same downlink transmission cycle;

or the plurality of first carrier signal phase measurement values specifically include: a plurality of carrier signal phase measurement values obtained by DL PRSs sent on DL OFDMs with exceeding a preset bandwidth and a preset power many times in a same downlink transmission cycle at a preset second time interval.

Optionally, a phase change of carrier signals transmitted in the preset second time interval is less than 0.5 carrier signal transmission cycle, and corresponds to a carrier phase change value pi.

Optionally, in response to that two first carrier signal phase measurement values measured in a same downlink data transmission cycle being $\{\theta_{2i}^m, \theta_{2i+1}^m\}$, a time interval between $\{\theta_{2i}^m, \theta_{2i+1}^m\}$ being $\delta_1$, two first carrier signal phase measurement values measured at two time points $\{t_{2i+1}, t_{2i+2}\}$ across the uplink data transmission cycle being $\{\theta_{2i+1}^m, \theta_{2i+2}^m\}$, and a time interval between $\{\theta_{2i+1}^m, \theta_{2i+2}^m\}$ being $\delta_2$, where i=0, 1, 2, . . . , then the processor is configured to determine the second carrier signal phase measurement values for positioning the terminal by an interpolation algorithm.

Optionally, the determining the second carrier signal phase measurement values for positioning the terminal by an interpolation algorithm, includes:

determining a change rate of $\{\theta_{2i}^m, \theta_{2i+1}^m\}$ as $(\theta_{2i+1}^m - \theta_{2i}^m)/\delta_1$;

determining a change rate of $\{\theta_{2i+1}^m, \theta_{2i+2}^m\}$ as:

$$\dot{\theta}_{2i} \approx ([(\theta_{2i+3}^m - \theta_{2i+2}^m) + (\theta_{2i+1}^m - \theta_{2i}^m)]/2\delta_1$$
$$(i=0,1,2,\ldots)\};$$

satisfying $\theta_0 = \theta_0^m$; $\theta_1 = \theta_1^m$;

calculating carrier signal phase predicted values $\hat{\theta}_{2i+2}$ based on $\theta_{2i+1}^m$ and the change rate $\dot{\theta}_{2i}$ by a formula of:

$$\hat{\theta}_{2i+2} = (\theta_{2i+1}^m + \dot{\theta}_{2i} * \delta_2);$$

determining the second carrier signal phase measurement values $\theta_{2i+2}$ by a formula of:

$$\theta_{2i+2} = \begin{cases} \theta_{2i+2}^m + 2n\pi, & \text{if } |\theta_{2i+2}^m - \text{mod}(\hat{\theta}_{2i+2}, 2\pi)| < \pi \\ \theta_{2i+2}^m + 2(n-1)\pi, & \text{if } [\theta_{2i+2}^m - \text{mod}(\hat{\theta}_{2i+2}, 2\pi)] > \pi \\ \theta_{2i+2}^m + 2(n+1)\pi, & \text{if } [\theta_{2i+2}^m - \text{mod}(\hat{\theta}_{2i+2}, 2\pi)] < -\pi \end{cases}$$

where $n = \lfloor \hat{\theta}_{2i+2}/2\pi \rfloor$ represents a whole period part of $\hat{\theta}_{2i+2}$, and $\lfloor . \rfloor$ represents rounding up;

determining the second carrier signal phase measurement values $\theta_{2i+1}$ by a formula of:

$$\theta_{2i+1} = \theta_{2i} + (\theta_{2i+1}^m - \theta_{2i}^m) \ (i=1,2,3,\ldots).$$

Optionally, the processor is configured to determine whether the phase change of the carrier signals transmitted in the predefined first time interval is less than the preset value in one of the following ways:

in a first way: reporting an accuracy of a crystal oscillator of a terminal receiver and a Doppler frequency of the terminal so that the network side judges whether the phase change of the carrier signals transmitted in the predefined first time interval is less than the preset value according to an accuracy of a crystal oscillator of a base station transmitter and the accuracy of the crystal oscillator of the terminal receiver and the Doppler frequency of the terminal reported by the terminal, and receiving indication information on whether the phase change of the carrier signals transmitted in the predefined first time interval is less than the preset value sent by the network side;

in a second way: receiving the accuracy of a crystal oscillator of a base station transmitter provided by the network side, and determining whether the phase change of the carrier signals transmitted in the predefined first time interval is less than the preset value according to the accuracy of the crystal oscillator of the base station transmitter as well as the accuracy of a crystal oscillator of a terminal receiver and a Doppler frequency of the terminal.

On the network side, a device for determining information provided by an embodiment of the present application includes:

a memory configured to store program instructions;

a processor configured to read the memory to execute the program instructions to perform followings:

obtaining carrier signal phase measurement values reported by a terminal, where the carrier signal phase measurement values are determined by the terminal based on carrier signals discontinuously sent by a network side;

determining positioning information of the terminal according to the carrier signal phase measurement values.

Optionally, before the obtaining the carrier signal phase measurement values reported by the terminal, the processor is further configured to:

receive the accuracy of a crystal oscillator of a terminal receiver and a Doppler frequency of the terminal; determine whether a phase change of carrier signals transmitted in a predefined first time interval is less than a preset value according to the accuracy of a crystal oscillator of a base station transmitter and the accuracy of the crystal oscillator of the terminal receiver and the Doppler frequency of the terminal, and send indication information on whether the phase change of the carrier signals transmitted in the predefined first time interval is less than the preset value to the terminal;

or, send the accuracy of the crystal oscillator of the base station transmitter to the terminal.

Optionally, the discontinuously sent carrier signals specifically include: DL PRSs sent on one or more DL OFDM symbols with exceeding a preset bandwidth and a preset power.

Optionally, carrier signals sent discontinuously in a same downlink data transmission cycle include:

DL PRSs sent on one or more DL OFDM symbols with exceeding a preset bandwidth and a preset power, and C-PRSs;

or DL PRSs sent on DL OFDMs with exceeding the preset bandwidth and preset power many times in the same downlink transmission cycle at a preset second time interval.

Optionally, a phase change of carrier signals transmitted in the preset second time interval is less than 0.5 carrier signal transmission cycle, and corresponds to a carrier phase change value pi.

On the terminal side, another device for determining information provided by an embodiment of the present application includes:

a receiving unit configured to receive carrier signals discontinuously sent by a network side;

a determining unit configured to determine carrier signal phase measurement values for positioning a terminal based on the carrier signals discontinuously sent by the network side.

On the network side, another device for determining information provided by an embodiment of the present application includes:

an obtaining unit configured to obtain carrier signal phase measurement values reported by a terminal, where the carrier signal phase measurement values are determined by the terminal based on carrier signals discontinuously sent by a network side;

a positioning unit configured to determine positioning information of the terminal according to the carrier signal phase measurement values.

Another embodiment of the present application provides a computing device, which includes a memory and a processor, where the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION OF THE EMBODIMENTS

Figure 1:
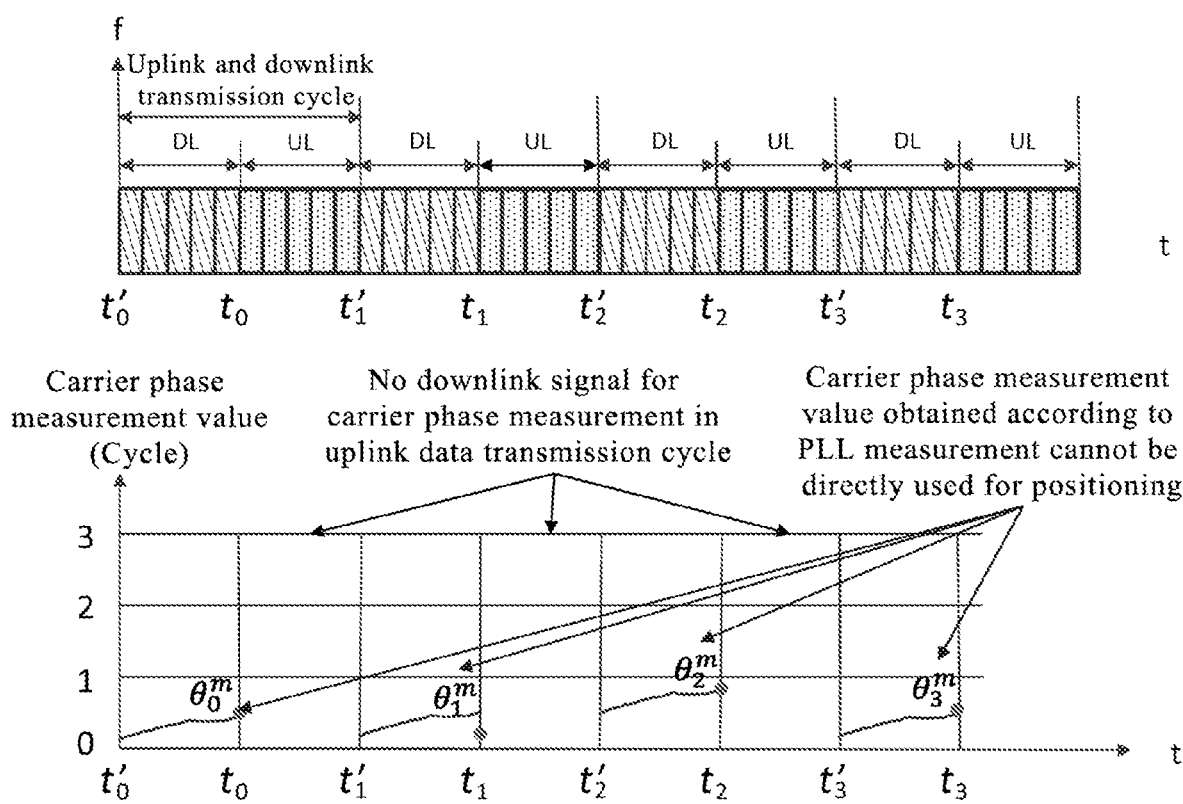
FIG. 1 is a schematic diagram in which the alternate transmission of TDD uplink and downlink signals causes the phase to lose lock and the carrier phase measurement cannot be directly used for carrier phase positioning provided by an embodiment of the present application.

The technical solutions in the embodiments of the present application will be described clearly and completely below in combination with the accompanying drawings in the embodiments of the present application. Obviously the described embodiments are only a part of the embodiments of the present application but not all the embodiments. Based upon the embodiments of the present application, all of other embodiments obtained by those ordinary skilled in the art without creative work pertain to the protection scope of the present application.

The embodiments of the present application provide a method and device for determining information, so as to implement the terminal positioning based on the carrier signal phase measurement value and improve the terminal positioning accuracy.

Here, the method and apparatus are based on the same application concept. Since the principle of solving the problem in the method is similar to that in the apparatus, the implementations of the apparatus and method can refer to each other, and the repeated description thereof will be omitted.

The technical solutions provided by the embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the Radio Access Network (RAN), and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber unit, subscriber station, mobile station, mobile, remote station, access point, remote terminal, access terminal, user terminal, user agent, user device, which is not limited in the embodiments of the present application.

The network device involved in embodiments of the present application may be a base station, which may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, where the rest of the access network may include IP networks. The network device can further coordinate the attribute management of the air interface. For example, the network device involved in the embodiments of the present application can be a network device (Base Transceiver Station, BTS) in the Global System of Mobile communication (GSM) or Code Division Multiple Access (CDMA), or can be a network device (NodeB) in the Wideband Code Division Multiple Access (WCDMA), or can be an evolutional network device (evolutional Node B, eNB or e-NodeB) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the technical solutions provided by the embodiments.

The embodiments of the present application propose a terminal positioning method based on the carrier phase of a signal of the radio communication system itself. This method can obtain the carrier signal phase measurement value by measuring the phase difference between the received radio reference signal and the radio signal generated at the receiver. Since the measurement error of the carrier signal phase measurement value can reach a small part of the carrier wavelength (for example: centimeter level), the location of the UE will be determined with high accuracy by using the carrier signal phase measurement value combined with other existing positioning methods.

The key to the terminal positioning method based on the carrier phase of the signal of the radio communication system itself is to obtain the carrier signal phase measurement value by measuring the signal of the radio communication system itself. To this end, it is assumed that the wireless signal transmitter (such as a base station) involved in positioning sends the C-PRS so that the wireless signal receiver (such as a terminal) locks the continuous carrier positioning reference signal through a phase-locked loop to obtain a carrier signal phase measurement value that can be used for carrier phase positioning.

However, the transmitter sends a continuous carrier phase positioning reference signal, which is not applicable to the 5G New Radio (NR) Time Division Duplex (TDD) radio communication system. In the 5G NR TDD system, the base station cell and the user terminal do not support the transmission of continuous and uninterrupted radio reference signals, but send and receive radio reference signals alternately.

Therefore, regardless of whether the downlink or uplink reference signal is used for carrier phase positioning, since the uplink and downlink signals are sent alternately, the phase-locked loop at the receiver will lose the phase lock due to intermittently no input signal. During the losing-lock period of the phase-locked loop, if the change in carrier phase exceeds 0.5 cycle, then the carrier phase actual value may not be obtained correctly from the received carrier signal phase measurement value and the provided carrier signal phase measurement value may not be suitable for positioning when the phase-locked loop relocks the carrier signal.

In the NR TDD, the maximum DL/UL configuration period for switching between Downlink (DL) and Uplink (UL) signal transmissions among all DL/UL configuration periods (DL/UL switch periods) is 10 ms. During each UL transmission, since the Base Station (BS) does not transmit DL signals, the UE carrier Phase Locked Loop (PLL) will lose the phase lock.

FIG. 1 takes the downlink carrier phase measurement as an example to further describe two key issues that need to be considered when the TDD system is based on carrier phase positioning.

Key issue 1: in the uplink data transmission cycle (such as cycle $\{t_i, t'_{i+1}\}$ (i=0, 1, . . . ) in FIG. 1), the UE sends an uplink signal, but the base station sends no downlink signal. Since there is no downlink carrier phase signal, the phase of the carrier phase tracking loop of the UE receiver is out of lock, and there is no carrier signal phase measurement value. In order to support carrier phase positioning, in each downlink data transmission cycle (such as cycle $\{t'_i, t_i\}$(i=0, 1, . . . ) in FIG. 1), the carrier signal phase-locked loop of the UE receiver must relock the downlink signals fastly in each short period of time. It is ensured that at least one carrier signal phase measurement value $\{\theta_0^m, \theta_1^m, \theta_2^m, . . . \}$ can be provided in each downlink data transmission cycle. It should be noted that m is the abbreviation of measure and not a specific parameter value.

Key issue 2: the phase measurement values $\{\theta_0^m, \theta_1^m, \theta_2^m, . . . \}$ provided when the carrier signal phase-locked loop relocks the carrier phase is only a small part of the entire circular cycle, that is, $0 \leq \theta_i^m < 2\pi$. If the actual carrier phase change is small (for example, no more than 0.5 cycle (that is, the carrier signal transmission cycle here is the uplink data transmission cycle)) in the uplink data transmission cycle (UL cycle), the receiver may derive the periodic change of the carrier phase correctly from the carrier signal phase measurement values $\{\theta_0^m, \theta_1^m, \theta_2^m, . . . \}$ provided when the carrier phase is relocked and provide a carrier signal phase measurement value suitable for precise positioning. If the actual carrier phase change exceeds 0.5 cycle in the uplink data transmission cycle, the receiver cannot derive the periodic change of the carrier phase correctly only from the carrier signal phase measurement values $\{\theta_0^m, \theta_1^m, \theta_2^m, . . . \}$ provided when the carrier phase is relocked, and the provided carrier signal phase measurement value cannot be directly used for precise positioning.

Therefore, in the 5G NR TDD system, the following key issues must be solved when the carrier phase is used for positioning.

In each downlink data transmission cycle, the carrier signal phase-locked loop (PLL) of the UE receiver must be able to relock the downlink signal quickly, and provide at least one carrier signal phase measurement value $\{\theta_0^m, \theta_1^m, \theta_2^m, . . . \}$.

In each uplink signal cycle, if the actual carrier phase change is small, it is possible to derive the carrier signal phase measurement value which includes the periodic change of the carrier phase and can be used for carrier phase positioning according to the carrier signal phase measurement values $\{\theta_0^m, \theta_1^m, \theta_2^m, . . . \}$ provided when the PLL relocks the carrier phase. If the actual carrier phase change is large in the uplink signal cycle, it is impossible to derive the carrier signal phase measurement value which includes the periodic change of the carrier phase only according to the carrier signal phase measurement values $\{\theta_0^m, \theta_1^m, \theta_2^m, . . . \}$ provided when the PLL relocks the carrier phase. In this case, we must firstly consider how to obtain the carrier signal phase measurement value that includes the periodic change of the carrier phase and can be used for carrier phase positioning.

The following technical solutions provided by embodiments of the present application take TDD DL carrier phase positioning as an example (the same method can be used for TDD UL carrier phase positioning).

In order to solve the two key issues described above, some embodiments of the present application propose a technical solution for obtaining a carrier signal phase measurement value that can be used for carrier phase positioning from discontinuous TDD carrier signals.

Figure 2:
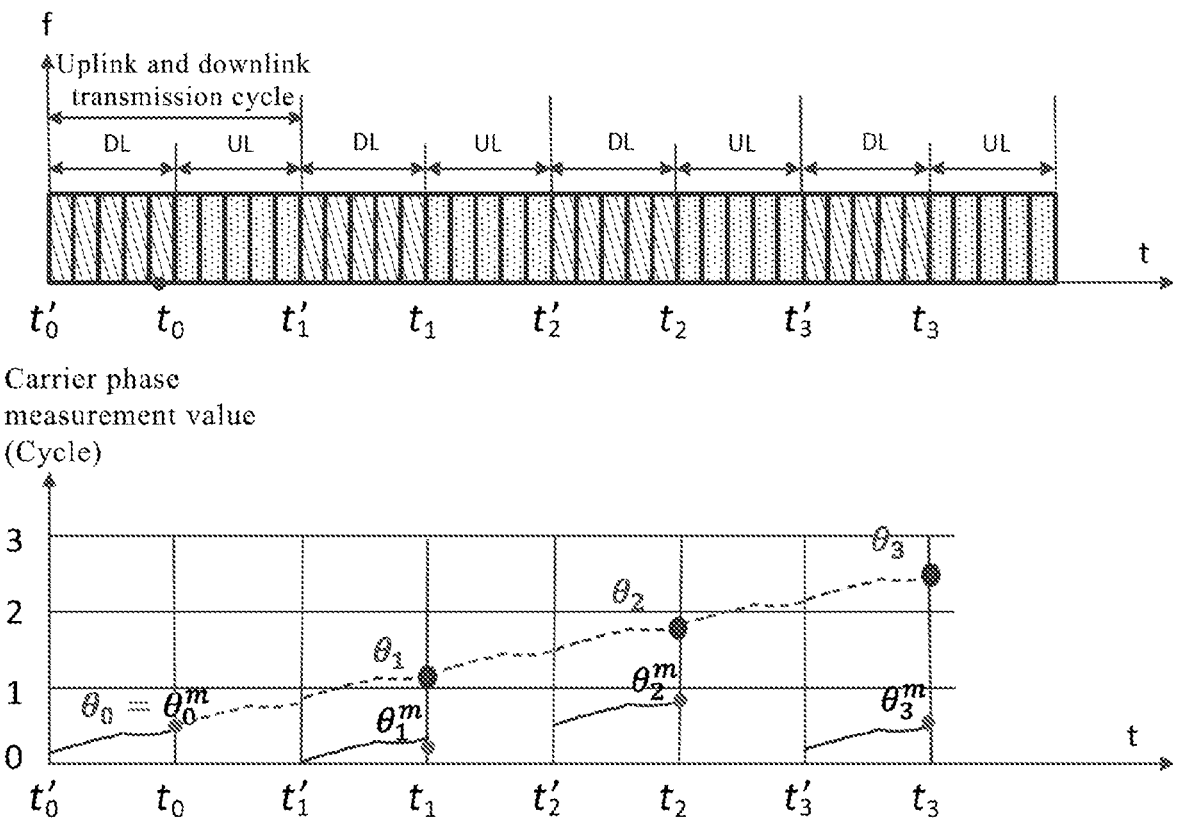
FIG. 2 is a schematic diagram of TDD carrier phase measurement suitable for carrier phase positioning provided by an embodiment of the present application.

The method used to solve the key issue 1 is: firstly each base station on the network side uses one or more DL OFDM symbols to send the DL PRS (as shown in FIG. 2) with large bandwidth (the specific value can be determined according to actual needs, for example, full bandwidth) and high power (the specific value can be determined according to actual needs, for example, full power) after each DL transmission cycle starts, to ensure that the carrier signal phase-locked loop of the UE receiver can relock the downlink signal quickly in each downlink data transmission cycle (DL cycle). At least one carrier phase measurement value $\{\theta_0^m, \theta_1^m, \theta_2^m, . . . \}$ can be provided in each downlink data transmission cycle.

When solving the key issue 2, firstly it is judged whether the actual carrier phase change between losing lock of the phase of the phase-locked loop (the moment when the previous measured carrier phase is obtained) and re-locking of the carrier signal by the phase-locked loop after losing lock (the moment when the next measured carrier phase is obtained) is less than 0.5 cycle. Then, according to the judgment whether the actual carrier phase change between losing lock of the phase of the phase-locked loop and re-locking of the carrier signal by the phase-locked loop after losing lock is less than 0.5 cycle, different methods are used to obtain the carrier phase measurement value that includes the periodic change of the carrier phase and can be used for carrier phase positioning.

Regarding judging whether the actual carrier phase change before losing lock of the phase of the phase-locked loop is less than 0.5 cycle:

two following methods can be used to judge whether the actual carrier phase change between losing lock of the phase of the phase-locked loop and re-locking of the carrier signal by the phase-locked loop is less than 0.5 cycle.

Method 1) judgment on the network side: the network judges whether the actual carrier phase change between losing lock of the phase of the phase-locked loop and re-locking of the carrier signal by the phase-locked loop is less than 0.5 cycle based on the known information (for example, the accuracy performance of the crystal oscillators of the transmitter and receiver as well as the Doppler frequency of the UE, etc.), and notifies the terminal through broadcast signaling, Radio Resource Control (RRC) signaling or Downlink Control Information (DCI) signaling. When using this method, the network side may require the terminal to report the accuracy of the crystal oscillator of the terminal receiver and the Doppler frequency of the UE to the network side.

Method 2) judgment on the terminal side: the terminal judges whether the actual carrier phase change between losing lock of the phase of the phase-locked loop and re-locking of the carrier signal by the phase-locked loop is less than 0.5 cycle based on the known information (for example, the accuracy performance of the crystal oscillators of the transmitter and receiver as well as the Doppler frequency of the UE, etc.), and reports the above judgment result to the network through RRC signaling. When using this method, the terminal may require the network side to provide the accuracy of the crystal oscillator of the base station transmitter. The above judgment result is reported to the network through RRC signaling. When using this method, the terminal may require the network side to provide the accuracy of the crystal oscillator of the base station transmitter.

The operation introduction of the methods 1 and 2 is given below, and the main difference lies in the first-step operation on the network side and the terminal side.

Network Side:

1) In a first way: the network judges whether the actual carrier phase change between losing lock of the phase of the phase-locked loop and re-locking of the carrier signal by the phase-locked loop is less than 0.5 cycle based on the known information (for example, the accuracy performance of the crystal oscillators of the transmitter and receiver as well as the Doppler frequency of the UE, etc.), to obtain two cases (CASEs). Here, CASE1: less than 0.5 cycle; CASE2: greater than or equal to 0.5 cycle. Then the network side notifies the terminal of the indication information of the CASE1 and CASE2 through broadcast signaling, RRC signaling or DCI signaling. For the CASE2, it further includes method 1 or method 2;

In a second way: the network side provides the terminal with the accuracy of the crystal oscillator of the base station transmitter, and receives the indication information on whether the actual carrier phase change between losing lock of the phase of the phase-locked loop and re-locking of the carrier signal by the phase-locked loop is less than 0.5 cycle. Here, CASE1: less than 0.5 cycle; CASE2: greater than or equal to 0.5 cycle.

Figure 3:
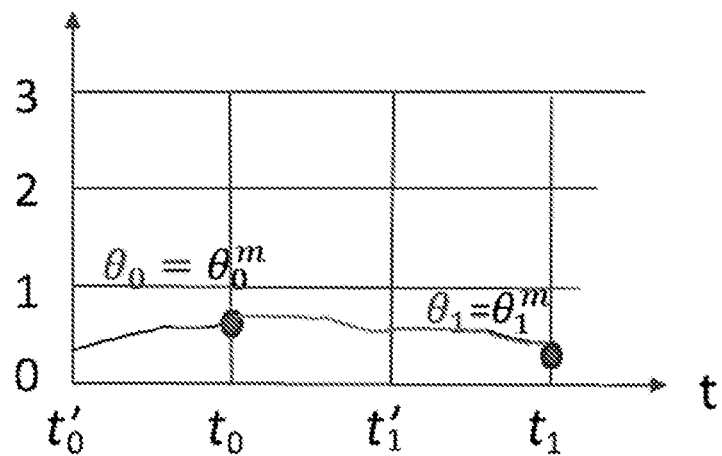
FIGS. 3 to 5 are schematic diagrams of carrier signal phase measurement values $\theta_i$ provided by an embodiment of the present application.
Figure 4:
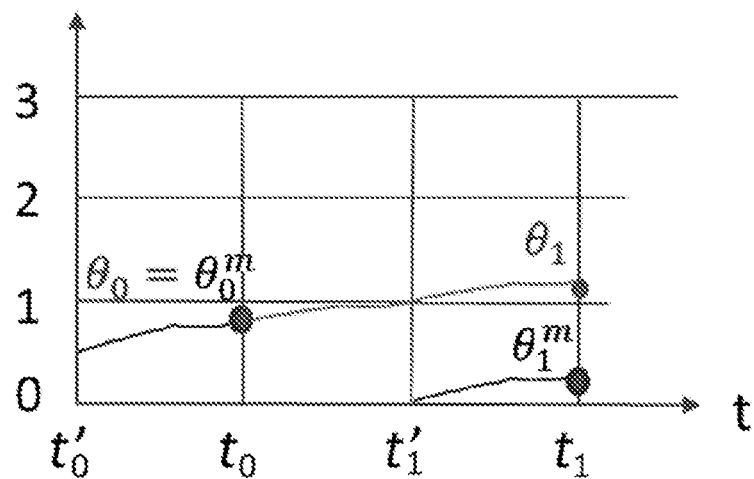
Figure 5:
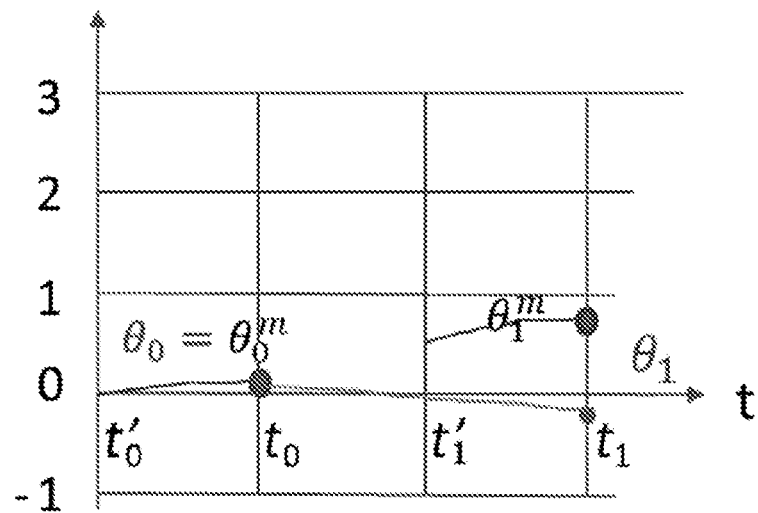

2) For the CASE1: The network side only needs to send the DL PRS using one or more DL OFDM symbols with large bandwidth and high power after each DL transmission cycle starts (as shown in FIGS. 3-5), to ensure that the carrier signal phase-locked loop of the UE receiver can relock the downlink signal quickly in each downlink data transmission cycle and a carrier signal phase measurement value is provided.

3) For the CASE2: consider two methods.

Method 1: simultaneously send the DL PRS and C-PRS on the OFDM symbols of the DL transmission cycle;

Method 2: send a plurality of PRSs in the DL transmission cycle (specifically described in combination with FIG. 7 hereafter), and ensure that the selection of a plurality of time intervals for sending the DL PRS requires that the change between adjacent carrier signal phase measurement values $\{\theta_0^m, \theta_1^m, \theta_2^m, \ldots\}$ is less than 0.5 cycle.

Terminal:

1) In a first way: the terminal reports the accuracy of the crystal oscillator of the terminal receiver and the Doppler frequency of the UE to the network side, and receives the information on whether the actual carrier phase change between losing lock of the phase of the phase-locked loop and re-locking of the carrier signal by the phase-locked loop is less than 0.5 cycle issued from the network side through broadcast signaling, RRC signaling or DCI signaling, namely: CASE1 or CASE2, and the method 1 or method 2 configured by network for the CASE2;

In a second way: the terminal receives the accuracy of the crystal oscillator of the base station transmitter provided by the network side, judges whether the actual carrier phase change between losing lock of the phase of the phase-locked loop and re-locking of the carrier signal by the phase-locked loop is less than 0.5 cycle based on the known information (for example, the accuracy performance of the crystal oscillators of the transmitter and receiver as well as the Doppler frequency of the UE, etc.), and reports the above judgment result to the network through RRC signaling.

2) For the CASE1: the basic assumption is that the carrier signal phase measurement value output when the PLL of the UE receiver re-locks the phase in the DL cycle is in [0, 1) cycle, i.e., corresponding to [0, 2*pi), after the UL cycle with no input signal. The UE derives the carrier signal phase measurement value that correctly tracks the periodic change of the carrier phase and can be used for carrier phase positioning by a simple algorithm.

3) For the CASE2:

Method 1:

Since there will be no problem of phase losing lock between two phase measurement values provided in the same DL transmission cycle (i.e., downlink data transmission cycle), the UE uses these two phase measurement values to calculate the change rate of the phase measurement values in the DL transmission cycle, where these two phase measurement values include the phase measurement value obtained by the DL PRS sent using one or more DL OFDM symbols with large bandwidth and high power, and the phase measurement value obtained by the C-PRS sent on other OFDM symbols of the DL transmission cycle. Since the time of the UL transmission cycle (i.e., uplink data transmission cycle) is only a few milliseconds, it can be assumed that the change rate of the carrier phase of the UL transmission cycle is basically the same as the change rate of the carrier phase of the adjacent DL transmission cycle. Therefore, it can be inferred whether there is a carrier phase cycle change between two phase measurement values that span the UL transmission cycle. The change rate of the carrier phase of the target UL transmission cycle is calculated based on the change rate of the phase measurement values of the adjacent DL transmission cycle, the carrier signal phase measurement values of the previous DL transmission cycle of the target UL transmission cycle are further combined to estimate the carrier phase predicted value in the target UL transmission cycle, and the actual value of the carrier phase is obtained by calculation.

The basic idea of the processing algorithm of the Method 1 is: assume that the difference between the predicted carrier phase value $\hat{\theta}_{2i+2}$ and the ideal carrier phase value $\theta_{2i+2}$ is within 0.5 cycle. The change rate of the carrier phase of the target UL transmission cycle is calculated based on the change rate of the phase measurement values of the adjacent DL transmission cycle, the carrier signal phase measurement values of the previous DL transmission cycle of the target UL transmission cycle are further combined to estimate the carrier phase predicted value in the target UL transmission cycle, and the actual value of the carrier phase is obtained through the interpolation algorithm.

Method 2:

The UE firstly derives the carrier signal phase measurement value that correctly tracks the periodic change of the carrier phase in each DL transmission cycle, then calculates the change rate of the phase measurement value in a DL transmission cycle by using the algorithm mentioned in the Method 1, and infers the periodic change of the actual phase that may occur in the UL transmission cycle based on the assumption that the actual phase change rate of the UL transmission cycle is basically the same as the calculated change rate of the DL transmission cycle; and finally, obtains the carrier signal phase measurement value that correctly tracks the periodic change of the carrier phase and can be used for carrier phase positioning.

The method includes:

During each DL transmission cycle, the PLL of the UE must be able to relock the downlink reference signal before the end of each DL transmission cycle and provide a carrier signal phase measurement value. The carrier signal phase-locked loop PLL obtains the 'appropriate' carrier signal phase measurement value $\{\theta_0^m, \theta_1^m, \theta_2^m, \ldots\}$ (also referred to as the first carrier signal phase measurement value hereafter) from the intermittently sent TDD signal (i.e., the non-continuously sent carrier signal). Here, the 'appropriate' carrier signal phase measurement value is a carrier signal phase measurement value that can be used to re-derive and correctly track the periodic change of the carrier phase (also referred to as the second carrier signal phase measurement value hereafter).

The signal processing is performed on the 'appropriate' carrier signal phase measurement value $\{\theta_0^m, \theta_1^m, \theta_2^m, \ldots\}$ provided by the carrier signal phase-locked loop PLL to obtain a carrier signal phase measurement value $\{\theta_0, \theta_1, \theta_2, \ldots\}$ that correctly tracks the periodic change of the carrier phase and can be used for carrier phase positioning.

In order to ensure that the UE PLL can quickly relock the downlink reference signal during each DL transmission cycle, at least one carrier signal phase measurement value is provided. Here we propose to send the DL PRS using one or more DL OFDM symbols with large bandwidth and high power (preferably full bandwidth, full power transmission of the base station) after each DL transmission cycle starts (as shown in FIGS. 3-5), to ensure that the carrier signal phase-locked loop of the UE receiver can relock the downlink signal quickly in each downlink data transmission cycle and a carrier signal phase measurement value is provided. The additional benefits of the DL PRS transmission with large bandwidth and high power also include: helping the UE to obtain more accurate Reference Signal Time Difference (RSTD) and UE transmit-receive time difference measurement values. The accurate RSTD and UE transmit-receive time difference measurement is the key to using traditional OTDOA and/or Round-Trip Time (RTT) positioning methods to obtain the accurate initial UE position estimation. The UE carrier phase positioning needs to use the UE position estimation obtained by the OTDOA and/or RTT as the initial value of the carrier phase positioning. The accurate initial UE position estimation is one of the keys to reducing the search time for integer ambiguity of carrier phase positioning.

CASE1: the network has inferred that the actual carrier phase change between the carrier signal phase measurement value of an uplink cycle and the carrier signal phase measurement value of a downlink cycle (these two carrier signal phase measurement values are adjacent) is less than 0.5 cycle based on the known information (for example, the accuracy performance of the crystal oscillators of the transmitter and receiver as well as the Doppler frequency of the UE, etc.). Here, the maximum time interval between two adjacent carrier signal phase measurement values is the cumulative sum of the DL cycle and the UL cycle, for example: 10 ms.

For example: for TDD, we assume that the frequency offset of the crystal oscillators of the base station and the terminal is within +/−0.02 ppm, and the duration from loss of lock to relock is 10 ms, and the carrier frequency is 2 GHz. The carrier phase change due to the frequency offset during this period is $(2*10^9)*(0.02*10^{(-6)})*(10*10^{(-3)})$ =0.4 cycle. If it is further assumed that the indoor UE speed is 1 m/s, the carrier phase change caused by the UE motion is $(1/\text{Speed of Light})*(2*10^9)*(10*10^{-3} \text{ s})$=0.066 cycle, where the speed of light=$3.0*10^8$ (m/s).

The basic assumption is that the carrier signal phase measurement value output when the PLL of the UE receiver re-locks the phase in the DL cycle is in [0, 1) cycle, i.e., corresponding to [0, 2*pi), after the UL cycle with no input signal.

When the carrier signal phase-locked loop of the UE receiver can quickly relock the downlink signal in each downlink data transmission cycle, the carrier signal phase measurement value $\{\theta_0^m, \theta_1^m, \theta_2^m, \ldots\}$ obtained by the carrier signal phase-locked loop from the intermittently sent TDD downlink signal is the 'appropriate' carrier phase positioning measurement value, where $\theta_i^m$ represents the measurement value at time $t_i$. According to $\{\theta_0^m, \theta_1^m, \theta_2^m, \ldots\}$, the carrier signal phase measurement value $\{\theta_0, \theta_1, \theta_2, \ldots\}$ that correctly tracks the periodic change of the carrier phase and can be used for carrier phase positioning can be derived by the interpolation algorithm, where $\theta_i$ represents the carrier signal phase measurement value at time $t_i$.

The first-order linear interpolation algorithm is taken as an example for description below:

$$\theta_0 = \theta_0^m \qquad (1)$$

$$\theta_{i+1} = \theta_i + \delta_i (i = 0, 1, \ldots) \qquad (2)$$

$$\delta_i = \begin{cases} (\theta_{i+1}^m - \theta_i^m), & \text{if } |(\theta_{i+1}^m - \theta_i^m)| < \pi \\ (\theta_{i+1}^m - \theta_i^m) - 2\pi, & \text{if } (\theta_{i+1}^m - \theta_i^m) > \pi \\ (\theta_{i+1}^m - \theta_i^m) + 2\pi, & \text{if } (\theta_{i+1}^m - \theta_i^m) < -\pi \end{cases} \qquad (3)$$

Here, the full-period and non-full-period parts of the carrier signal phase measurement value $\theta_i$ are $\lfloor \theta_i/2\pi \rfloor$ and $\mod(\theta_i, 2\pi)$ respectively, where $\lfloor \theta_i/2\pi \rfloor$ represents the ordinate value shown in FIG. 3 to FIG. 5, and the value thereof is 0, 1, 2, . . . , and the full period represents an integer multiple of 2*pi. Regarding the full period and the non-full period: a period is 360 degrees or $2\pi$ radians. When the PPL is initially phase-locked, the carrier phase measurement value is in [0, 2π]. After the PPL is locked, the carrier phase measurement value is required to track the change of the real carrier phase. As shown in FIG. 1, the full period of the real carrier phase $\theta_3$ is 2, and the non-full period part is ($\theta_3$−2*2π).

Referring to FIG. 3, Example 1: the carrier signal phase measurement value at time $t_0$ is $\theta_0^m$=0.5 cycle, the carrier signal phase measurement value at time $t_1$ is $\theta_1^m$=0.3 cycle, then: $\theta_0=\theta_0^m$=0.5 cycle, $\delta_0=\theta_1^m-\theta_0^m$=0.3−0.5=−0.2; $\theta_1=\theta_0+\delta_0$=0.5−0.2=0.3 cycle.

Referring to FIG. 4, Example 2: the carrier signal phase measurement value at time $t_0$ is $\theta_0^m$=0.9 cycle, the carrier signal phase measurement value at time $t_1$ is $\theta_1^m$=0.2 cycle, then: $\theta_0=\theta_0^m$=0.9 cycle, $\delta_0=\theta_1^m-\theta_0^m+2\pi$=0.2−0.9+1=0.3 cycle; $\theta_1=\theta_0+\delta_0$=0.9+0.3=1.2 cycle.

Referring to FIG. 5, Example 3: the carrier signal phase measurement value at time $t_0$ is $\theta_0^m$=0.2 cycle, the carrier signal phase measurement value at time $t_1$ is $\theta_1^m$=0.8 cycle, then: $\theta_0=\theta_0^m$=0.2 cycle, $\delta_0=\theta_1^m-\theta_0^m-2\pi$=0.8−0.2−1=−0.4 cycle; $\theta_1=\theta_0+\delta_0$=0.2−0.4=−0.2 cycle.

CASE2: if the network infers that the actual carrier phase change is relatively large (for example, greater than or equal to 0.5 cycle) in each uplink data transmission cycle in advance according to the known information (for example, the quality of the oscillators of the transmitter and receiver as well as the Doppler frequency of the UE, etc.). It is difficult to derive the carrier signal phase measurement value that correctly tracks the periodic change of the carrier phase only according to the carrier signal phase measurement values $\{\theta_0^m, \theta_1^m, \theta_2^m, \ldots\}$ provided when the UE PLL re-locks the carrier phase. At this time, it is necessary to further consider how to obtain the carrier signal phase measurement value that correctly tracks the periodic change of the carrier phase.

Two methods are given below to obtain the carrier signal phase measurement value that tracks the periodic change of the carrier phase.

Figure 6:
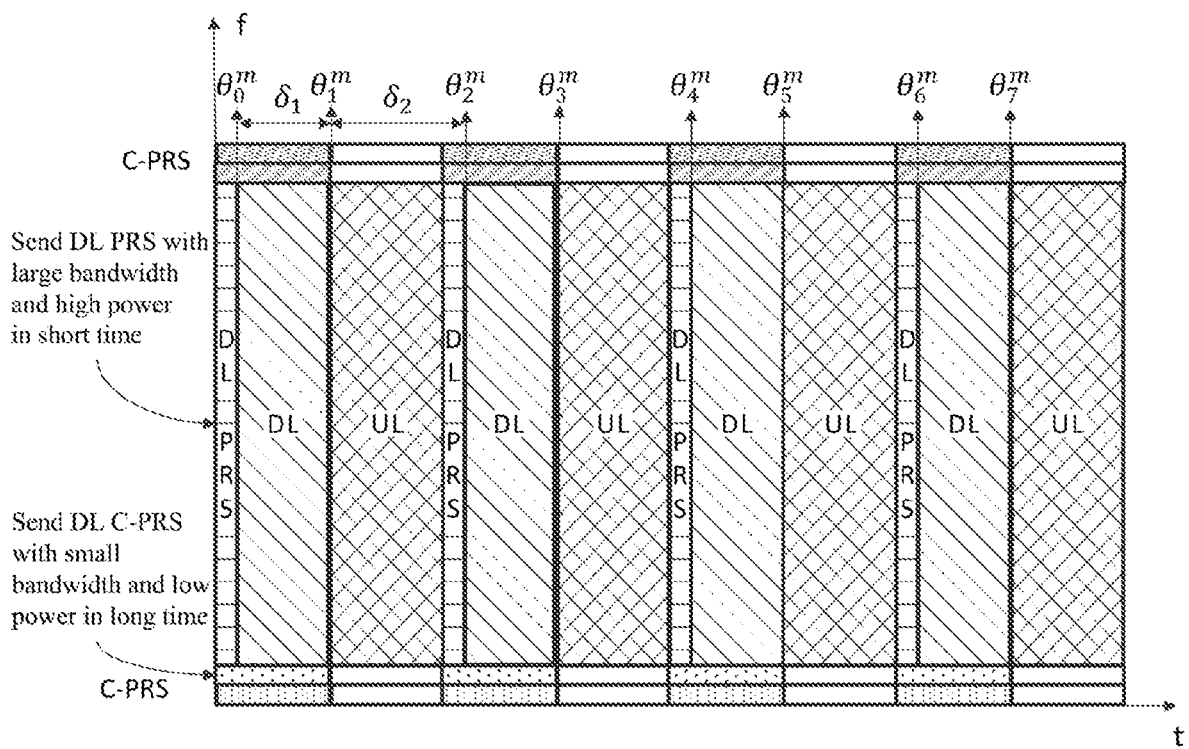
FIG. 6 is a schematic diagram of the transmission of PRSs and C-PRSs for TDD carrier phase positioning and the carrier phase measurement provided by an embodiment of the present application.

Method 1: send the DL C-PRS on the OFDM symbols of the DL transmission cycle (as shown in FIG. 6).

In this method, in addition to sending the DL PRS using one or more DL OFDM symbols with large bandwidth and high power after each DL transmission cycle starts, the continuous Carrier phase-Positioning Reference Signal (C-PRS) is also sent on other OFDM symbols of the DL transmission cycle. When the C-PRS is a sinusoidal carrier signal, the bandwidth of the signal can be very small, for example: 6 KHz or 15 KHz. The purpose of sending the C-PRS is to use very few system resources to ensure that the UE PLL remains in the phase-locked state, so that the UE PLL provides at least one phase measurement value again before the end of the DL transmission cycle except for the carrier signal phase measurement values provided when relocking the downlink signal in each DL transmission cycle. Since there will be no problem of phase losing lock between two phase measurement values provided in the same DL transmission cycle, these two phase measurement values (i.e., the phase measurement value obtained by the DL PRS sent using one or more DL OFDM symbols with large bandwidth and high power, and the phase measurement value obtained by the C-PRS sent on other OFDM symbols of the DL transmission cycle) can be used to calculate the change rate of the phase measurement value in the DL transmission cycle. Since the time of the UL transmission cycle is only a few milliseconds, it can be assumed that the change rate of the carrier phase of the UL transmission cycle is basically the same as the change rate of the carrier phase of the adjacent DL transmission cycle. Therefore, it can be inferred whether there is a carrier phase cycle change between two phase measurement values that span the UL transmission cycle.

As shown in FIG. 6, it is assumed that two phase measurement values measured in the same DL transmission cycle are $\{\theta_{2i}^m, \theta_{2i+1}^m\}$ (i=0, 1, 2, ...), where: $\{\theta_{2i}^m\}$ (i=0, 1, 2, ...) is the carrier signal phase measurement value provided when relocking the downlink signal; and $\{\theta_{2i+1}^m\}$ (i=0, 1, 2, ...) is the carrier signal phase measurement value provided by the C-PRS before the end of the DL transmission cycle.

It is assumed that the time interval between $\{\theta_{2i}^m, \theta_{2i+1}^m\}$ (i=0, 1, 2, ...) is $\delta_1$ and the time interval between $\{\theta_{2i+1}^m, \theta_{2i+2}^m\}$ (i=0, 1, 2, ...) is $\delta_2$. Since two phase measurement values measured in the same DL transmission cycle are $\{\theta_{2i}^m, \theta_{2i+1}^m\}$ (i=0, 1, 2 ...), there is no problem of phase losing lock, and the change rate of the phase measurement values in $\{\theta_{2i}^m, \theta_{2i+1}^m\}$ (i=0, 1, 2 ...) is $(\theta_{2i+1}^m - \theta_{2i}^m)/\delta_1$. Therefore, the change rate of the phase measurement values between two time points $\{t_{2i+1}, t_{2i+2}\}$ (i=0, 1, 2, ...) across the UL transmission cycle can be calculated using the following formula:

$$\dot{\theta}_{2i} \approx \{[(\theta_{2i+3}^m - \theta_{2i+2}^m) + (\theta_{2i+1}^m - \theta_{2i}^m)]/2\delta_1 \\ (i=0,1,2,\ldots)\} \tag{4}$$

Therefore, based on $\{\theta_0^m, \theta_1^m, \theta_2^m, \ldots\}$, the carrier signal phase measurement value $\{\theta_0, \theta_1, \theta_2, \ldots\}$ that correctly tracks the periodic change of the carrier phase and can be used for carrier phase positioning can be derived by an appropriate algorithm (such as the interpolation algorithm described below).

The basic idea of this algorithm is: suppose that the difference between the predicted carrier phase value $\hat{\theta}_{2i+2}$ and the ideal carrier phase value $\theta_{2i+2}$ is within 0.5 cycle. The change rate of the carrier phase of the target UL transmission cycle is calculated based on the change rate of the phase measurement values of the adjacent DL transmission cycle, the carrier signal phase measurement values of the previous DL transmission cycle of the target UL transmission cycle are further combined to estimate the carrier phase predicted value in the target UL transmission cycle, and the actual value of the carrier phase is obtained through the interpolation algorithm.

The first-order linear interpolation algorithm is taken as an example for description below.

For example:

For $\theta_0$ and $\theta_1$, we get:

$$\theta_0 = \theta_0^m; \theta_1 = \theta_1^m \tag{5}$$

Figure 7:
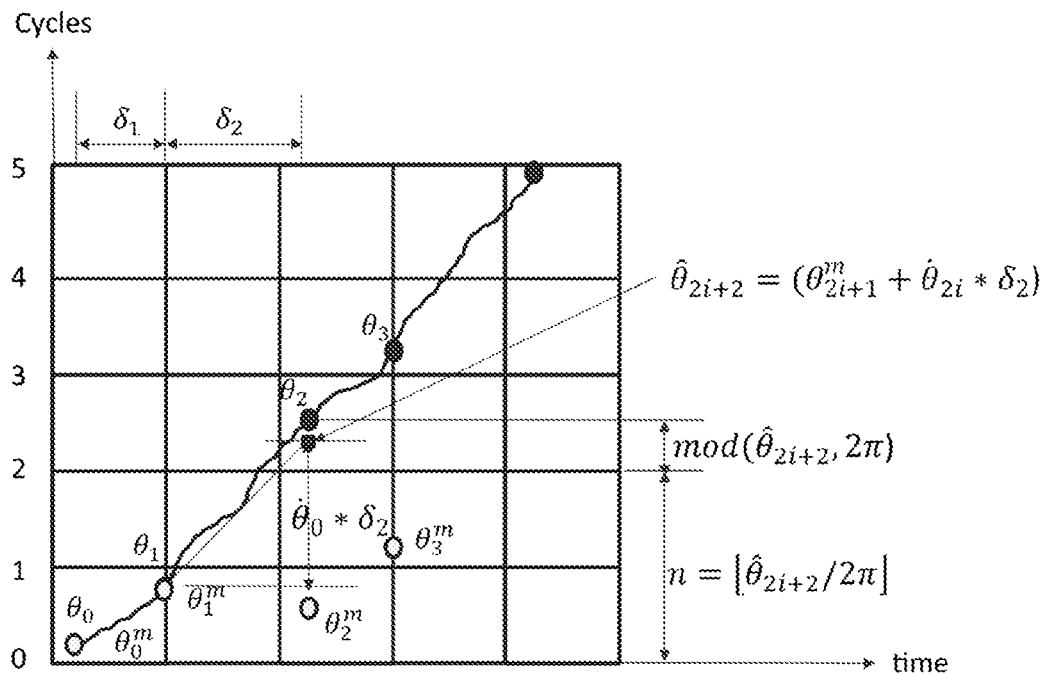
FIG. 7 is a schematic diagram of carrier phase measurement for TDD carrier phase positioning provided by an embodiment of the present application.

For $\theta_{2i+2}$ (i=0, 1, 2, 3, ...), the carrier phase prediction value $\hat{\theta}_{2i+2}$ can be calculated based on $\theta_{2i+1}^m$ and the change rate $\dot{\theta}_{2i}$ (as shown in FIG. 7):

$$\hat{\theta}_{2i+2} = (\theta_{2i+1}^m + \dot{\theta}_{2i} * \delta_2) \tag{6}$$

It is assumed that the full-period part and the non-full-period part of $\hat{\theta}_{2i+2}$ are $n = \lfloor \hat{\theta}_{2i+2}/2\pi \rfloor$ and $\mathrm{mod}(\hat{\theta}_{2i+2}, 2\pi)$, respectively.

According to whether the difference between the non-full-period part of the predicted carrier phase value $\hat{\theta}_{2i+2}$ and the actually-measured carrier phase value $\theta_{2i+2}^m$ is within 0.5 cycle, the true carrier phase value $\theta_{2i+2}$ is determined by the following formula:

$$\theta_{2i+2} = \begin{cases} \theta_{2i+2}^m + 2n\pi, & \text{if } \left|\theta_{2i+2}^m - \mathrm{mod}(\hat{\theta}_{2i+2}, 2\pi)\right| < \pi \\ \theta_{2i+2}^m + 2(n-1)\pi, & \text{if } \left[\theta_{2i+2}^m - \mathrm{mod}(\hat{\theta}_{2i+2}, 2\pi)\right] > \pi \\ \theta_{2i+2}^m + 2(n+1)\pi, & \text{if } \left[\theta_{2i+2}^m - \mathrm{mod}(\hat{\theta}_{2i+2}, 2\pi)\right] < -\pi \end{cases} \tag{7}$$

For $\theta_{2i+1}$ (i=1,2,3, ...), $\theta_{2i}^m$ and $\theta_{2i+1}^m$ are two phase measurement values measured in the same DL transmission cycle, and the UE PLL between $\theta_{2i}^m$ and $\theta_{2i+1}^m$ does not lose lock. Therefore, the method of calculating the predicted value based on the change rate is not required to use the formula (6) and formula (7) to calculate $\theta_{2i+1}$; and instead, the principle that the difference between the phase measurement values $\theta_{2i+1}$ and $\theta_{2i}$ to be solved is equal to the difference between the known phase measurement values $\theta_{2i+1}^m$ and $\theta_{2i}^m$ is directly used to perform the interpolation to calculate $\theta_{2i+1}$, as shown in the following formula:

$$\theta_{2i+1} = \theta_{2i} + (\theta_{2i+1}^m - \theta_{2i}^m) \ (i=1,2,3,\ldots) \tag{8}$$

Here, $\theta_{2i}$ (i=1, 2, 3, ...) is calculated by formula (7).

Figure 8:
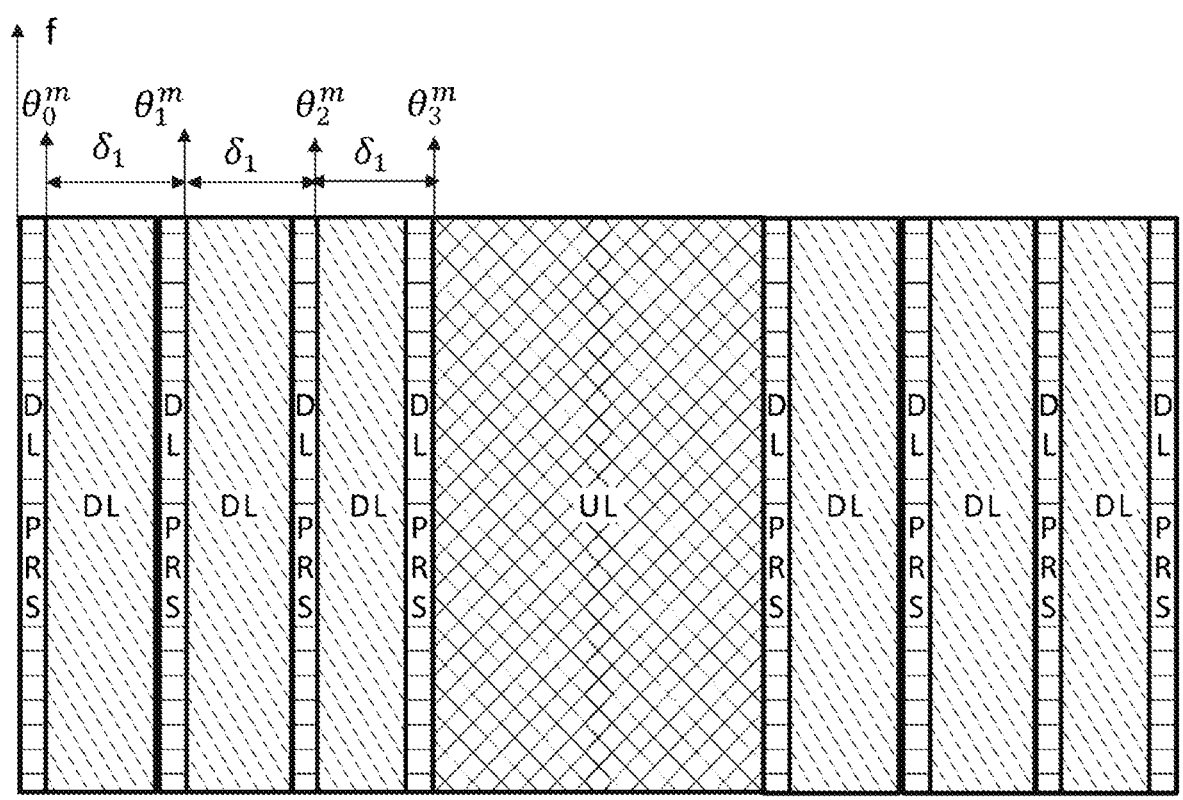
FIG. 8 is a schematic diagram of the transmission of PRSs for TDD carrier phase positioning and the carrier phase measurement provided by an embodiment of the present application.

Method 2: send a plurality of PRSs in the DL transmission cycle (as shown in FIG. 8).

In this method, after each DL transmission cycle starts, the DL PRS is sent multiple times using one or more DL OFDM symbols with large bandwidth and high power at a certain time interval, to obtain a plurality of carrier signal phase measurement values $\{\theta_0^m, \theta_1^m, \theta_2^m, \ldots\}$. The selection of the time interval for sending the DL PRS multiple times requires that the change between the phase measurement values $\{\theta_0^m, \theta_1^m, \theta_2^m, \ldots\}$ is less than 0.5 cycle. For example:

For the phase measurement values $\{\theta_0^m, \theta_1^m, \theta_2^m, \ldots\}$ measured in each DL transmission cycle, since the change between the phase measurement values is less than 0.5 cycle, the carrier signal phase measurement value that correctly tracks the periodic change of the carrier phase in each DL transmission cycle can be firstly derived. After the carrier signal phase measurement value that correctly tracks the periodic change of the carrier phase in each DL transmission cycle is obtained, the algorithm mentioned in the method 1 can be used to calculate the change rate of the phase measurement value in a DL transmission cycle, and the periodic change of the actual phase that may occur in the UL transmission cycle is calculated on the assumption that the actual phase change rate of the UL transmission cycle is basically the same as the calculated change rate of the DL transmission cycle. Finally, the carrier measurement value that correctly tracks the periodic change of the carrier phase and can be used for carrier phase positioning is obtained.

Figure 9:
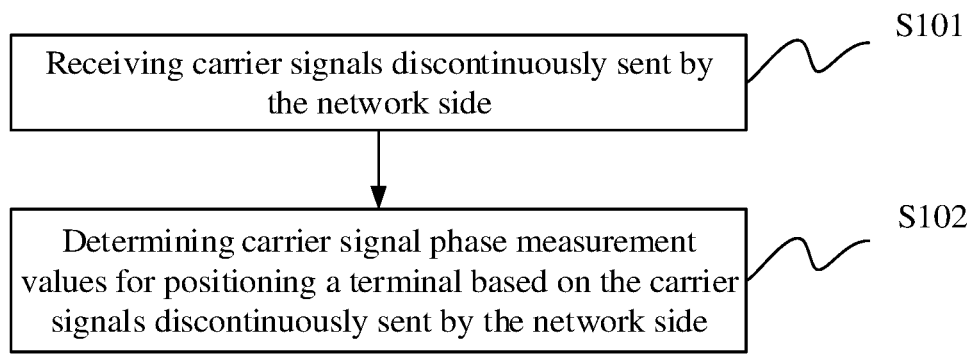
FIG. 9 is a schematic flowchart of a method for determining information on the terminal side provided by an embodiment of the present application.

In summary, on the terminal side, referring to FIG. 9, a method for determining information provided by an embodiment of the present application includes followings.

S101: receiving carrier signals discontinuously sent by the network side.

The carrier signals discontinuously sent by the network side are, for example, the intermittently sent TDD carrier signals described above.

S102: determining carrier signal phase measurement values for positioning a terminal based on the carrier signals discontinuously sent by the network side.

Through this method, the carrier signal phase measurement values for positioning the terminal are determined based on the carrier signals discontinuously sent by the network side, thereby realizing the determination of the carrier signal phase measurement values for positioning the terminal based on the carrier signals discontinuously sent by the network side, so that the network side can position the terminal based on the carrier signal phase measurement values after the terminal reports the carrier signal phase measurement values to the network side, improving the positioning accuracy.

Optionally, determining carrier signal phase measurement values for positioning a terminal based on the carrier signals discontinuously sent by the network side, specifically includes:

obtaining first carrier signal phase measurement values (e.g., $\{\theta_0^m, \theta_1^m, \theta_2^m, \ldots\}$ described above) based on the carrier signals discontinuously sent by the network side through carrier signal phase-locked loop;

deriving second carrier signal phase measurement values (e.g., $\{\theta_0, \theta_1, \theta_2, \ldots\}$ described above) for positioning the terminal from the first carrier signal phase measurement values.

Optionally, the first carrier signal phase measurement values include $\{\theta_0^m, \theta_1^m, \theta_2^m, \ldots\}$; where $\theta_i^m$ represents a first carrier signal phase measurement value at time $t_i$;

the second carrier signal phase measurement values include $\{\theta_0, \theta_1, \theta_2, \ldots\}$, where $\theta_i$ represents a second carrier signal phase measurement value at time $t_i$.

Optionally, when the phase change of carrier signals transmitted in a predefined first time interval is less than a preset value (for example, the above CASE1), $\{\theta_0, \theta_1, \theta_2, \ldots\}$ is derived from $\{\theta_0^m, \theta_1^m, \theta_2^m, \ldots\}$ by using interpolation and modulo algorithms.

Optionally, the preset value is 0.5 carrier signal transmission cycle, which corresponds to a carrier phase change value pi.

Optionally, the predefined first time interval refers to a time interval from a moment when a previous carrier phase measurement value is obtained before phase lock of the phase-locked loop is lost to a moment when the phase-locked loop re-locks carrier signals after the phase lock is lost and a next carrier phase measurement value is obtained, where the maximum value of the predefined first time interval is the sum of an uplink data transmission cycle and a downlink data transmission cycle, and the minimum value of the predefined first time interval is the uplink data transmission cycle, for example 0.5 cycle.

Optionally, $\{\theta_0, \theta_1, \theta_2, \ldots\}$ is derived using a formula of:

$$\theta_0 = \theta_0^m$$
$$\theta_{i+1} = \theta_i + \delta_i (i = 0, 1, \ldots)$$
$$\delta_i = \begin{cases} (\theta_{i+1}^m - \theta_i^m), & \text{if } |(\theta_{i+1}^m - \theta_i^m)| < \pi \\ (\theta_{i+1}^m - \theta_i^m) - 2\pi, & \text{if } (\theta_{i+1}^m - \theta_i^m) > \pi \\ (\theta_{i+1}^m - \theta_i^m) + 2\pi, & \text{if } (\theta_{i+1}^m - \theta_i^m) < -\pi \end{cases}$$

Optionally, when the phase change of carrier signals transmitted in the predefined first time interval (for example, uplink data transmission cycle) is greater than or equal to a preset value (for example, the above CASE2), the step of deriving the second carrier signal phase measurement values for positioning the terminal from the first carrier signal phase measurement values includes:

determining carrier signal phase predicted values in a target uplink data transmission cycle by using a change rate of a plurality of (two or more, two as an example in the above embodiment, but not limited to two) first carrier signal phase measurement values in a same downlink data transmission cycle and first carrier signal phase measurement values in a previous downlink data transmission cycle of the target uplink data transmission cycle, and determining the second carrier signal phase measurement values for positioning the terminal according to the carrier signal phase predicted values.

Optionally, the plurality of first carrier signal phase measurement values (for example, corresponding to the above method 1) specifically include: carrier signal phase measurement values obtained by DL PRSs sent on one or more DL OFDM symbols with exceeding a preset bandwidth and a preset power, and carrier signal phase measurement values obtained by C-PRSs sent on other OFDM symbols in a same downlink transmission cycle;

or, the plurality of first carrier signal phase measurement values (for example, corresponding to the above method 2) specifically include: a plurality of (two or more, two as an example in the above embodiment, but not limited to two) carrier signal phase measurement values obtained by DL PRSs sent on DL OFDMs with exceeding a preset bandwidth and a preset power many times in a same downlink transmission cycle at a preset second time interval.

Optionally, a phase change of carrier signals transmitted in the preset second time interval is less than 0.5 carrier signal transmission cycle, and a carrier phase change value is pi.

Optionally, assuming that two first carrier signal phase measurement values measured in a same downlink data transmission cycle are $\{\theta_{2i}^m, \theta_{2i+1}^m\}$, a time interval between $\{\theta_{2i}{}^m, \theta_{2i+1}{}^m\}$ is $\delta_1$, two first carrier signal phase measurement values measured at two time points $\{t_{2i+1}, t_{2i+2}\}$ across the uplink data transmission cycle being $\{\theta_{2i+1}{}^m, \theta_{2i+2}{}^m\}$, and a time interval between $\{\theta_{2i+1}{}^m, \theta_{2i+2}{}^m\}$ is $\delta_2$, where i=0, 1, 2, . . . , then the second carrier signal phase measurement values for positioning the terminal are specifically determined by an interpolation algorithm.

Optionally, the determining the second carrier signal phase measurement values for positioning the terminal by an interpolation algorithm, includes:

determining a change rate of $\{\theta_{2i}{}^m, \theta_{2i+1}{}^m\}$ as $(\theta_{2i+1}{}^m - \theta_{2i}{}^m)/\delta_1$;

determining a change rate of $\{\theta_{2i+1}{}^m, \theta_{2i+2}{}^m\}$ as:

$$\dot{\theta}_{2i} \approx [(\theta_{2i+3}{}^m - \theta_{2i+2}{}^m) + (\theta_{2i+1}{}^m - \theta_{2i}{}^m)]/2\delta_1$$
$$(i=0,1,2, \ldots)\};$$

letting $\theta_0 = \theta_0{}^m$; $\theta_1 = \theta_1{}^m$;

calculating carrier signal phase predicted values $\hat{\theta}_{2i+2}$ based on $\theta_{2i+1}{}^m$ and the change rate $\dot{\theta}_{2i}$ by a formula of:

$$\hat{\theta}_{2i+2} = (\theta_{2i+1}{}^m + \dot{\theta}_{2i} * \delta_2);$$

determining the second carrier signal phase measurement values $\theta_{2i+2}$ by a formula of:

$$\theta_{2i+2} = \begin{cases} \theta_{2i+2}^m + 2n\pi, & \text{if } |\theta_{2i+2}^m - \text{mod}(\hat{\theta}_{2i+2}, 2\pi)| < \pi \\ \theta_{2i+2}^m + 2(n-1)\pi, & \text{if } [\theta_{2i+2}^m - \text{mod}(\hat{\theta}_{2i+2}, 2\pi)] > \pi \\ \theta_{2i+2}^m + 2(n+1)\pi, & \text{if } [\theta_{2i+2}^m - \text{mod}(\hat{\theta}_{2i+2}, 2\pi)] < -\pi \end{cases}$$

where $n = \lfloor \hat{\theta}_{2i+2}/2\pi \rfloor$ represents a whole period part of $\hat{\theta}_{2i+2}$, and $\lfloor . \rfloor$ represents rounding up;

determining the second carrier signal phase measurement values $\theta_{2i+1}$ by a formula of:

$$\theta_{2i+1} = \theta_{2i} + (\theta_{2i+1}{}^m - \theta_{2i}{}^m) \ (i=1,2,3, \ldots).$$

Optionally, it is judged whether the phase change of the carrier signals transmitted in the predefined first time interval is less than the preset value in one of the following ways.

In a first way (judgment on the network side): reporting the accuracy of a crystal oscillator of a terminal receiver and a Doppler frequency of the terminal so that the network side judges whether the phase change of the carrier signals transmitted in the predefined first time interval is less than the preset value according to the accuracy of a crystal oscillator of a base station transmitter as well as the accuracy of the crystal oscillator of the terminal receiver and the Doppler frequency of the terminal reported by the terminal, and receiving indication information on whether the phase change of the carrier signals transmitted in the predefined first time interval is less than the preset value sent by the network side.

In a second way (judgment on the terminal side): receiving the accuracy of a crystal oscillator of a base station transmitter provided by the network side, and judging whether the phase change of the carrier signals transmitted in the predefined first time interval is less than the preset value according to the accuracy of the crystal oscillator of the base station transmitter as well as the accuracy of a crystal oscillator of a terminal receiver and a Doppler frequency of the terminal.

Figure 10:
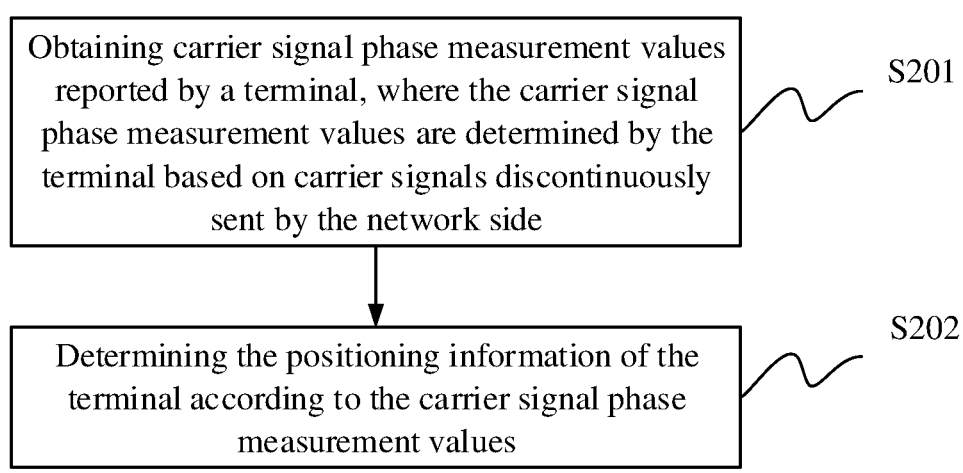
FIG. 10 is a schematic flowchart of a method for determining information on the network side provided by an embodiment of the present application.

Correspondingly, on the network side, referring to FIG. 10, a method for determining information provided by an embodiment of the present application includes:

S201: obtaining carrier signal phase measurement values reported by a terminal, where the carrier signal phase measurement values are determined by the terminal based on carrier signals discontinuously sent by the network side;

S202: determining the positioning information of the terminal according to the carrier signal phase measurement values.

Optionally, before obtaining the carrier signal phase measurement values reported by the terminal, the method further includes:

receiving the accuracy of a crystal oscillator of a terminal receiver and a Doppler frequency of the terminal; judging whether a phase change of carrier signals transmitted in a predefined first time interval is less than a preset value according to the accuracy of a crystal oscillator of a base station transmitter as well as the accuracy of the crystal oscillator of the terminal receiver and the Doppler frequency of the terminal, and sending indication information on whether the phase change of the carrier signals transmitted in the predefined first time interval is less than the preset value to the terminal;

or, sending the accuracy of the crystal oscillator of the base station transmitter to the terminal.

Optionally, the discontinuously sent carrier signals include: DL PRSs sent on one or more DL OFDM symbols with exceeding a preset bandwidth and a preset power.

Optionally, carrier signals sent discontinuously in a same downlink data transmission cycle include:

DL PRSs sent on one or more DL OFDM symbols with exceeding a preset bandwidth and a preset power, and C-PRSs;

or DL PRSs sent on DL OFDMs with exceeding the preset bandwidth and preset power many times in the same downlink transmission cycle at a preset second time interval.

Optionally, a phase change of carrier signals transmitted in the preset second time interval is less than 0.5 carrier signal transmission cycle, and a carrier phase change value is pi.

The devices provided by the embodiments of the present application will be introduced below.

Figure 11:
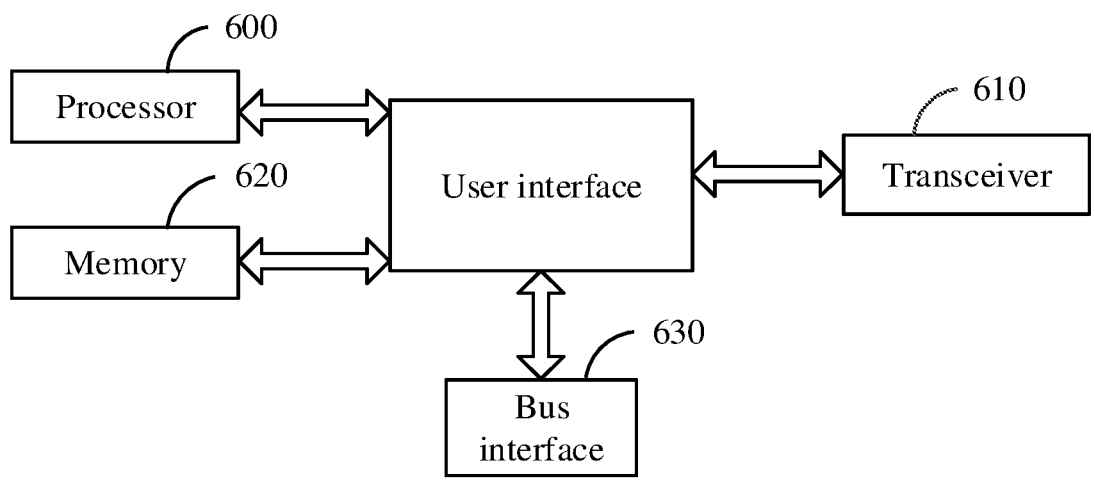
FIG. 11 is a structural schematic diagram of a device for determining information on the terminal side provided by an embodiment of the present application.

On the terminal side, referring to FIG. 11, a device for determining information provided by an embodiment of the present application includes:

a memory 620 configured to store program instructions;

a processor 600 configured to invoke the program instructions stored in the memory, and in accordance with the obtained program, perform the process of:

receiving carrier signals discontinuously sent by a network side;

determining carrier signal phase measurement values for positioning a terminal based on the carrier signals discontinuously sent by the network side.

Optionally, determining carrier signal phase measurement values for positioning a terminal based on the carrier signals discontinuously sent by the network side, includes:

obtaining first carrier signal phase measurement values based on the carrier signals discontinuously sent by the network side through carrier signal phase-locked loop;

deriving second carrier signal phase measurement values for positioning the terminal from the first carrier signal phase measurement values.

Optionally, the first carrier signal phase measurement values include $\{\theta_0{}^m, \theta_1{}^m, \theta_2{}^m, \ldots\}$; where $\theta_i{}^m$ represents a first carrier signal phase measurement value at time $t_i$;

the second carrier signal phase measurement values include $\{\theta_0, \theta_1, \theta_2, \ldots\}$, where $\theta_i$ represents a second carrier signal phase measurement value at time $t_i$.

Optionally, when a phase change of carrier signals transmitted in a predefined first time interval is less than a preset value, the processor derives $\{\theta_0, \theta_1, \theta_2, \ldots\}$ from $\{\theta_0^m, \theta_1^m, \theta_2^m, \ldots\}$ by using interpolation and modulo algorithms.

Optionally, the preset value is 0.5 carrier signal transmission cycle, which corresponds to a carrier phase change value pi.

Optionally, the predefined first time interval refers to a time interval from a moment when carrier phase measurement values are obtained before the phase lock of the phase-locked loop is lost to a moment when the phase-locked loop re-locks carrier signals to obtain carrier phase measurement values after the phase lock is lost, where a maximum value of the predefined first time interval is a sum of an uplink data transmission cycle and a downlink data transmission cycle, and a minimum value of the predefined first time interval is the uplink data transmission cycle.

Optionally, the processor specifically derives $\{\theta_0, \theta_1, \theta_2, \ldots\}$ using a formula of:

$$\theta_0 = \theta_0^m$$

$$\theta_{i+1} = \theta_i + \delta_i (i = 0, 1, \ldots)$$

$$\delta_i = \begin{cases} (\theta_{i+1}^m - \theta_i^m), & \text{if } |(\theta_{i+1}^m - \theta_i^m)| < \pi \\ (\theta_{i+1}^m - \theta_i^m) - 2\pi, & \text{if } (\theta_{i+1}^m - \theta_i^m) > \pi \\ (\theta_{i+1}^m - \theta_i^m) + 2\pi, & \text{if } (\theta_{i+1}^m - \theta_i^m) < -\pi \end{cases}$$

Optionally, when the phase change of carrier signals transmitted in the predefined first time interval (for example, uplink data transmission cycle) is greater than or equal to a preset value, the step of deriving the second carrier signal phase measurement values for positioning the terminal from the first carrier signal phase measurement values includes:

determining carrier signal phase predicted values in a target uplink data transmission cycle by using a change rate of a plurality of first carrier signal phase measurement values in a same downlink data transmission cycle and first carrier signal phase measurement values in a previous downlink data transmission cycle of the target uplink data transmission cycle, and determining the second carrier signal phase measurement values for positioning the terminal according to the carrier signal phase predicted values.

Optionally, the plurality of first carrier signal phase measurement values include: carrier signal phase measurement values obtained by DL PRSs sent on one or more DL OFDM symbols with exceeding a preset bandwidth and a preset power, and carrier signal phase measurement values obtained by C-PRSs sent on other OFDM symbols in a same downlink transmission cycle;

or the plurality of first carrier signal phase measurement values specifically include: a plurality of carrier signal phase measurement values obtained by DL PRSs sent on DL OFDMs with exceeding a preset bandwidth and a preset power many times in a same downlink transmission cycle at a preset second time interval.

Optionally, a phase change of carrier signals transmitted in the preset second time interval is less than 0.5 carrier signal transmission cycle, and a carrier phase change value is pi.

Optionally, assuming that two first carrier signal phase measurement values measured in a same downlink data transmission cycle are $\{\theta_{2i}^m, \theta_{2i+1}^m\}$, a time interval between $\{\theta_{2i}^m, \theta_{2i+1}^m\}$ is $\delta_1$, two first carrier signal phase measurement values measured at two time points $\{t_{2i+1}, t_{2i+2}\}$ across the uplink data transmission cycle are $\{\theta_{2i+1}^m, \theta_{2i+2}^m\}$, and a time interval between $\{\theta_{2i+1}^m, \theta_{2i+2}^m\}$ is $\delta_2$, where $i=0, 1, 2, \ldots$, then the processor specifically determines the second carrier signal phase measurement values for positioning the terminal by an interpolation algorithm.

Optionally, the determining the second carrier signal phase measurement values for positioning the terminal by an interpolation algorithm, includes:

determining a change rate of $\{\theta_{2i}^m, \theta_{2i+1}^m\}$ as $(\theta_{2i+1}^m - \theta_{2i}^m)/\delta_1$;

determining a change rate of $\{\theta_{2i+1}^m, \theta_{2i+2}^m\}$ as:

$$\dot{\theta}_{2i} \approx \{[(\theta_{2i+3}^m - \theta_{2i+2}^m) + (\theta_{2i+1}^m - \theta_{2i}^m)]/2\delta_1$$
$$(i=0,1,2,\ldots)\};$$

letting $\theta_0 = \theta_0^m$; $\theta_1 = \theta_1^m$;

calculating carrier signal phase predicted values $\hat{\theta}_{2i+2}$ based on $\theta_{2i+1}^m$ and the change rate $\dot{\theta}_{2i}$ by a formula of:

$$\hat{\theta}_{2i+2} = (\theta_{2i+1}^m + \dot{\theta}_{2i} * \delta_2);$$

determining the second carrier signal phase measurement values $\theta_{2i+2}$ by a formula of:

$$\theta_{2i+2} = \begin{cases} \theta_{2i+2}^m + 2n\pi, & \text{if } |\theta_{2i+2}^m - \text{mod}(\hat{\theta}_{2i+2}, 2\pi)| < \pi \\ \theta_{2i+2}^m + 2(n-1)\pi, & \text{if } [\theta_{2i+2}^m - \text{mod}(\hat{\theta}_{2i+2}, 2\pi)] > \pi \\ \theta_{2i+2}^m + 2(n+1)\pi, & \text{if } [\theta_{2i+2}^m - \text{mod}(\hat{\theta}_{2i+2}, 2\pi)] < -\pi \end{cases}$$

where $n = \lfloor \hat{\theta}_{2i+2}/2\pi \rfloor$ represents a whole period part of $\hat{\theta}_{2i+2}$, and $\lfloor . \rfloor$ represents rounding up;

determining the second carrier signal phase measurement values $\theta_{2i+1}$ by a formula of:

$$\theta_{2i+1} = \theta_{2i} + (\theta_{2i+1}^m - \theta_{2i}^m) \ (i=1,2,3,\ldots).$$

Optionally, the processor 600 judges whether the phase change of the carrier signals transmitted in the predefined first time interval is less than the preset value in one of the following ways.

In a first way: reporting the accuracy of a crystal oscillator of a terminal receiver and a Doppler frequency of the terminal so that the network side judges whether the phase change of the carrier signals transmitted in the predefined first time interval is less than the preset value according to the accuracy of a crystal oscillator of a base station transmitter as well as the accuracy of the crystal oscillator of the terminal receiver and the Doppler frequency of the terminal reported by the terminal, and receiving indication information on whether the phase change of the carrier signals transmitted in the predefined first time interval is less than the preset value sent by the network side.

In a second way: receiving the accuracy of a crystal oscillator of a base station transmitter provided by the network side, and judging whether the phase change of the carrier signals transmitted in the predefined first time interval is less than the preset value according to the accuracy of the crystal oscillator of the base station transmitter as well as the accuracy of a crystal oscillator of a terminal receiver and a Doppler frequency of the terminal.

The transceiver 610 is configured to receive and send the data under the control of the processor 600.

Here, in FIG. 11, the bus architecture can include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission media. For different user equipments, the user interface 630 may also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

Optionally, the processor 600 can be Central Processing Unit (CPU), Application Specific Integrated Circuit (ASIC), Field-Programmable Gate Array (FPGA) or Complex Programmable Logic Device (CPLD).

Figure 12:
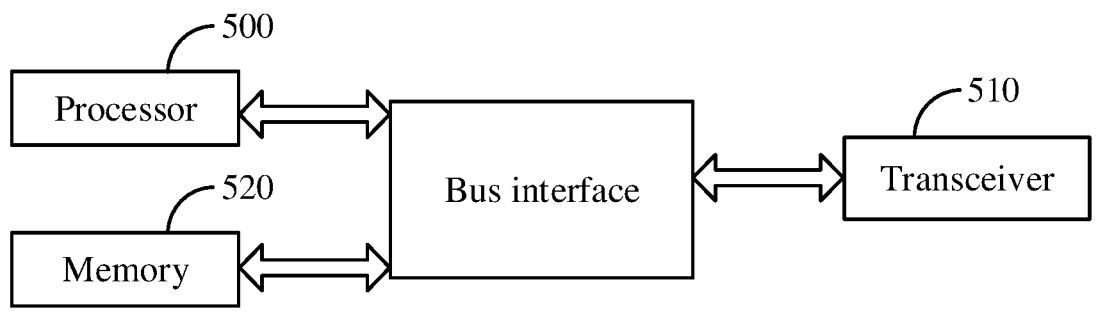
FIG. 12 is a structural schematic diagram of a device for determining information on the network side provided by an embodiment of the present application.

On the network side, referring to FIG. 12, a device for determining information provided by an embodiment of the present application includes:

a memory 520 configured to store program instructions;

a processor 500 configured to invoke the program instructions stored in the memory, and in accordance with the obtained program, perform the process of:

obtaining carrier signal phase measurement values reported by a terminal, where the carrier signal phase measurement values are determined by the terminal based on carrier signals discontinuously sent by a network side;

determining the positioning information of the terminal according to the carrier signal phase measurement values.

Optionally, before obtaining the carrier signal phase measurement values reported by the terminal, the processor is further configured to:

receive the accuracy of a crystal oscillator of a terminal receiver and a Doppler frequency of the terminal; judge whether a phase change of carrier signals transmitted in a predefined first time interval is less than a preset value according to the accuracy of a crystal oscillator of a base station transmitter as well as the accuracy of the crystal oscillator of the terminal receiver and the Doppler frequency of the terminal, and send the indication information on whether the phase change of the carrier signals transmitted in the predefined first time interval is less than the preset value to the terminal;

or, send the accuracy of the crystal oscillator of the base station transmitter to the terminal.

Optionally, the discontinuously sent carrier signals include: DL PRSs sent on one or more DL OFDM symbols with exceeding a preset bandwidth and a preset power.

Optionally, carrier signals sent discontinuously in a same downlink data transmission cycle specifically include:

DL PRSs sent on one or more DL OFDM symbols with exceeding a preset bandwidth and a preset power, and C-PRSs;

or DL PRSs sent on DL OFDMs with exceeding the preset bandwidth and preset power many times in the same downlink transmission cycle at a preset second time interval.

Optionally, a phase change of carrier signals transmitted in the preset second time interval is less than 0.5 carrier signal transmission cycle, and a carrier phase change value is pi.

The transceiver 510 is configured to receive and send the data under the control of the processor 500.

Here, in FIG. 12, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 13:
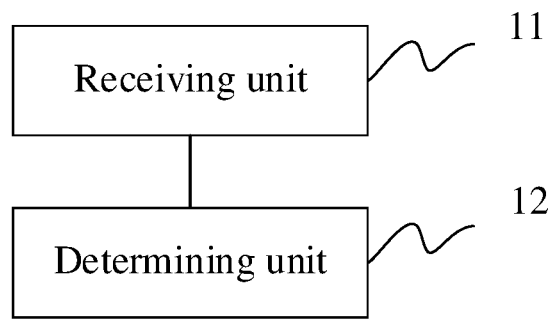
FIG. 13 is a structural schematic diagram of another device for determining information on the terminal side provided by an embodiment of the present application.

At the terminal side, referring to FIG. 13, another device for determining information provided by an embodiment of the present application includes:

a receiving unit 11 configured to receive carrier signals discontinuously sent by the network side;

a determining unit 12 configured to determine carrier signal phase measurement values for positioning a terminal based on the carrier signals discontinuously sent by the network side.

Figure 14:
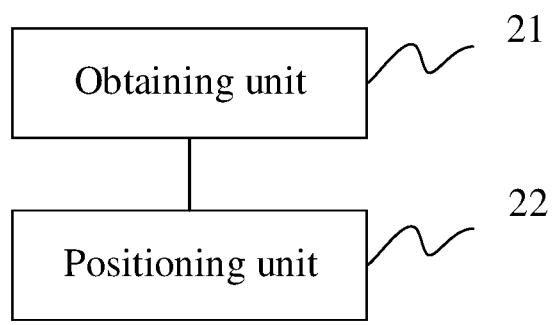
FIG. 14 is a structural schematic diagram of another device for determining information on the network side provided by an embodiment of the present application.

On the network side, referring to FIG. 14, another device for determining information provided by an embodiment of the present application includes:

an obtaining unit 21 configured to obtain carrier signal phase measurement values reported by a terminal, where the carrier signal phase measurement values are determined by the terminal based on carrier signals discontinuously sent by the network side;

a positioning unit 22 configured to determine the positioning information of the terminal according to the carrier signal phase measurement values.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a computer readable storage medium. Based on such understanding, the technical solution of the present application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc, MO or the like), optical memory (e.g., CD, DVD, BD, HVD or the like), semiconductor memory (e.g., ROM, EPROM, EEPROM, nonvolatile memory (NAND FLASH), Solid State Disk, SSD) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. Optionally, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like. which is not limited in the embodiments of the present application.

The processing flows of the above methods may be implemented by a software program, which may be stored in a storage medium. When the stored software program is invoked, the above method steps are performed.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method for determining information, comprises:

receiving carrier signals discontinuously sent by a network side;

determining carrier signal phase measurement values for positioning a terminal based on the carrier signals discontinuously sent by the network side;

wherein the determining carrier signal phase measurement values for positioning a terminal based on the carrier signals discontinuously sent by the network side, comprises:

obtaining first carrier signal phase measurement values based on the carrier signals discontinuously sent by the network side through a carrier signal phase-locked loop;

deriving second carrier signal phase measurement values for positioning the terminal from the first carrier signal phase measurement values;

wherein in response to a phase change of carrier signals transmitted in a predefined first time interval being less than a preset value, the deriving second carrier signal phase measurement values for positioning the terminal from the first carrier signal phase measurement values, comprises:

deriving second carrier signal phase measurement values for positioning the terminal from the first carrier signal phase measurement values by using an interpolation algorithm;

wherein in response to a phase change of carrier signals transmitted in a predefined first time interval being greater than or equal to a preset value, the deriving second carrier signal phase measurement values for positioning the terminal from the first carrier signal phase measurement values, comprises:

determining carrier signal phase predicted values in a target uplink data transmission cycle by using a change rate of a plurality of first carrier signal phase measurement values in a same downlink data transmission cycle and first carrier signal phase measurement values in a previous downlink data transmission cycle of the target uplink data transmission cycle, and determining the second carrier signal phase measurement values for positioning the terminal according to the carrier signal phase predicted values;

wherein the carrier signals comprise: Downlink Positioning Reference Signals, DL PRSs, sent on one or more Downlink Orthogonal Frequency Division Multiplexing, DL OFDM, symbols with exceeding a preset bandwidth and a preset power;

wherein carrier signals sent discontinuously in a same downlink data transmission cycle comprise:

DL PRSs sent on one or more DL OFDM symbols with exceeding a preset bandwidth and a preset power, and Carrier phase-Positioning Reference Signals, C-PRSs;

or DL PRSs sent on DL OFDMs with exceeding the preset bandwidth and preset power many times in the same downlink transmission cycle at a preset second time interval.

2. The method according to claim 1, wherein the first carrier signal phase measurement values comprise $\{\theta_0^m, \theta_1^m, \theta_2^m, \ldots\}$, wherein $\theta_i^m$ represents a first carrier signal phase measurement value at time ti;

the second carrier signal phase measurement values comprise $\{\theta_0, \theta_1, \theta_2, \ldots\}$, wherein $\theta_i$ represents a second carrier signal phase measurement value at time ti;

wherein in response to a phase change of carrier signals transmitted in a predefined first time interval being less than a preset value, $\{\theta_0, \theta_1, \theta_2, \ldots\}$ is derived from $\{\theta_0^m, \theta_1^m, \theta_2^m, \ldots\}$ by using an interpolation algorithm.

3. The method according to claim 2, wherein the preset value is 0.5 carrier signal transmission cycle, and corresponds to a carrier phase change value pi;

wherein the predefined first time interval refers to a time interval from a moment when carrier phase measurement values are obtained before phase lock of the phase-locked loop is lost to a moment when the phase-locked loop re-locks carrier signals to obtain carrier phase measurement values after the phase lock is lost, wherein a maximum value of the predefined first time interval is a sum of an uplink data transmission cycle and a downlink data transmission cycle, and a minimum value of the predefined first time interval is a uplink data transmission cycle.

4. The method according to claim 3, wherein $\{\theta_0, \theta_1, \theta_2, \ldots\}$ is derived by a formula of:

$$\theta_0 = \theta_0^m$$

$$\theta_{i+1} = \theta_i + \delta_i (i = 0, 1, \ldots)$$

$$\delta_i = \begin{cases} (\theta_{i+1}^m - \theta_i^m), & \text{if } |(\theta_{i+1}^m - \theta_i^m)| < \pi \\ (\theta_{i+1}^m - \theta_i^m) - 2\pi, & \text{if } (\theta_{i+1}^m - \theta_i^m) > \pi \\ (\theta_{i+1}^m - \theta_i^m) + 2\pi, & \text{if } (\theta_{i+1}^m - \theta_i^m) < -\pi \end{cases}$$

5. The method according to claim 1, wherein the plurality of first carrier signal phase measurement values comprise: carrier signal phase measurement values obtained by the DL PRSs, sent on one or more DL OFDM, symbols with exceeding a preset bandwidth and a preset power, and carrier signal phase measurement values obtained by C-PRSs sent on other OFDM symbols in a same downlink transmission cycle;

or the plurality of first carrier signal phase measurement values comprise: a plurality of carrier signal phase measurement values obtained by DL PRSs sent on DL OFDMs with exceeding a preset bandwidth and a preset power many times in a same downlink transmission cycle at a preset second time interval;

wherein a phase change of carrier signals transmitted in the preset second time interval is less than 0.5 carrier signal transmission cycle, and corresponds to a carrier phase change value pi;

wherein in response to that two first carrier signal phase measurement values measured in a same downlink data transmission cycle being $\{\theta_{2i}^m, \theta_{2i+1}^m\}$, a time interval between two first carrier signal phase measurement values in $\{\theta_{2i}^m, \theta_{2i+1}^m\}$ being $\delta_1$, two first carrier signal phase measurement values measured at two time points $\{t_{2i+1}, t_{2i+2}\}$ across the uplink data transmission cycle being $\{\theta_{2i+1}^m, \theta_{2i+2}^m\}$, and a time interval between two first carrier signal phase measurement values in $\{\theta_{2i+1}^m, \theta_{2i+2}^m\}$ being $\delta_2$, wherein i=0,1,2, . . . , the second carrier signal phase measurement values for positioning the terminal are determined by an interpolation algorithm.

6. The method according to claim 5, wherein the determining the second carrier signal phase measurement values for positioning the terminal by an interpolation algorithm, comprises:

determining a change rate of $\{\theta_{2i}^m, \theta_{2i+1}^m\}$ as $(\theta_{2i+1}^m - \theta_{2i}^m)/\delta_1$;

determining a change rate of $\{\theta_{2i+1}^m, \theta_{2i+2}^m\}$ as:

$$\dot{\theta}_{2i} \approx ([(\theta_{2i+3}^m - \theta_{2i+2}^m) + (\theta_{2i+1}^m - \theta_{2i}^m)]/2\delta_1$$
$$(i=0,1,2,\ldots)\};$$

satisfying $\theta_0 = \theta_0^m$; $\theta_1 = \theta_1^m$;

calculating carrier signal phase predicted values $\hat{\theta}_{2i+2}$ based on $\theta_{2i+1}^m$ and the change rate $\dot{\theta}_{2i}$ by a formula of:

$$\hat{\theta}_{2i+2} = (\theta_{2i+1}^m + \dot{\theta}_{2i} * \delta_2);$$

determining the second carrier signal phase measurement values $\theta_{2i+2}$ by a formula of:

$$\theta_{2i+2} = \begin{cases} \theta_{2i+2}^m + 2n\pi, & \text{if } |\theta_{2i+2}^m - \text{mod}(\hat{\theta}_{2i+2}, 2\pi)| < \pi \\ \theta_{2i+2}^m + 2(n-1)\pi, & \text{if } [\theta_{2i+2}^m - \text{mod}(\hat{\theta}_{2i+2}, 2\pi)] > \pi \\ \theta_{2i+2}^m + 2(n+1)\pi, & \text{if } [\theta_{2i+2}^m - \text{mod}(\hat{\theta}_{2i+2}, 2\pi)] < -\pi \end{cases}$$

wherein $n=\lfloor \hat{\theta}_{2i+2}/2\pi \rfloor$ represents a whole period part of $\hat{\theta}_{2i+2}$, and $\lfloor . \rfloor$ represents rounding up, (i=0,1,2, ... );

determining the second carrier signal phase measurement values $\theta_{2i+1}$ by a formula of:

$$\theta_{2i+1}=\theta_{2i}+(\theta_{2i+1}{}'''-\theta_{2i}{}''') \ (i=1,2,3,\ldots).$$

7. The method according to claim 2, wherein determining whether the phase change of the carrier signals transmitted in the predefined first time interval is less than the preset value in one of following ways:
  in a first way: reporting an accuracy of a crystal oscillator of a terminal receiver and a Doppler frequency of the terminal, and receiving indication information on whether the phase change of the carrier signals transmitted in the predefined first time interval is less than the preset value sent by the network side, wherein the indication information is determined by the network side according to the accuracy of a crystal oscillator of a base station transmitter and the accuracy of the crystal oscillator of the terminal receiver and the Doppler frequency of the terminal reported by the terminal;
  in a second way: receiving an accuracy of a crystal oscillator of a base station transmitter provided by the network side, and determining whether the phase change of the carrier signals transmitted in the predefined first time interval is less than the preset value according to the accuracy of the crystal oscillator of the base station transmitter and the accuracy of a crystal oscillator of a terminal receiver and a Doppler frequency of the terminal.

8. A method for determining information, comprises:
  obtaining carrier signal phase measurement values reported by a terminal, wherein the carrier signal phase measurement values are determined by the terminal based on carrier signals discontinuously sent by a network side;
  determining positioning information of the terminal according to the carrier signal phase measurement values;
  wherein before the obtaining the carrier signal phase measurement values reported by the terminal, the method further comprises:
  receiving an accuracy of a crystal oscillator of a terminal receiver and a Doppler frequency of the terminal;
  determining whether a phase change of carrier signals transmitted in a predefined first time interval is less than a preset value according to an accuracy of a crystal oscillator of a base station transmitter and the accuracy of the crystal oscillator of the terminal receiver and the Doppler frequency of the terminal, and sending indication information on whether the phase change of the carrier signals transmitted in the predefined first time interval is less than the preset value to the terminal;
  or, sending an accuracy of the crystal oscillator of the base station transmitter to the terminal;
  wherein the carrier signals comprise: Downlink Positioning Reference Signals, DL PRSs, sent on one or more Downlink Orthogonal Frequency Division Multiplexing, DL OFDM, symbols with exceeding a preset bandwidth and a preset power;
  wherein carrier signals sent discontinuously in a same downlink data transmission cycle comprise:
  DL PRSs sent on one or more DL OFDM symbols with exceeding a preset bandwidth and a preset power, and Carrier phase-Positioning Reference Signals, C-PRSs;
  or DL PRSs sent on DL OFDMs with exceeding the preset bandwidth and preset power many times in the same downlink transmission cycle at a preset second time interval.

9. The method according to claim 8, wherein a phase change of carrier signals transmitted in the preset second time interval is less than 0.5 carrier signal transmission cycle, and corresponds to a carrier phase change value pi.

10. A device for determining information, the device comprises:
  a memory configured to store program instructions;
  a processor configured to read the memory to execute the program instructions to perform followings:
  receiving carrier signals discontinuously sent by a network side;
  determining carrier signal phase measurement values for positioning a terminal based on the carrier signals discontinuously sent by the network side;
  wherein the determining carrier signal phase measurement values for positioning a terminal based on the carrier signals discontinuously sent by the network side, comprises:
  obtaining first carrier signal phase measurement values based on the carrier signals discontinuously sent by the network side through carrier signal phase-locked loop;
  deriving second carrier signal phase measurement values for positioning the terminal from the first carrier signal phase measurement values;
  wherein in response to a phase change of carrier signals transmitted in a predefined first time interval being less than a preset value, the deriving second carrier signal phase measurement values for positioning the terminal from the first carrier signal phase measurement values, comprises:
  deriving second carrier signal phase measurement values for positioning the terminal from the first carrier signal phase measurement values by using an interpolation algorithm;
  wherein in response to a phase change of carrier signals transmitted in a predefined first time interval being greater than or equal to a preset value, the deriving second carrier signal phase measurement values for positioning the terminal from the first carrier signal phase measurement values, comprises:
  determining carrier signal phase predicted values in a target uplink data transmission cycle by using a change rate of a plurality of first carrier signal phase measurement values in a same downlink data transmission cycle and first carrier signal phase measurement values in a previous downlink data transmission cycle of the target uplink data transmission cycle, and determining the second carrier signal phase measurement values for positioning the terminal according to the carrier signal phase predicted values;
  wherein the carrier signals comprise: Downlink Positioning Reference Signals, DL PRSs, sent on one or more Downlink Orthogonal Frequency Division Multiplexing, DL OFDM, symbols with exceeding a preset bandwidth and a preset power;
  wherein carrier signals sent discontinuously in a same downlink data transmission cycle comprise:
  DL PRSs sent on one or more DL OFDM symbols with exceeding a preset bandwidth and a preset power, and Carrier phase-Positioning Reference Signals, C-PRSs;

or DL PRSs sent on DL OFDMs with exceeding the preset bandwidth and preset power many times in the same downlink transmission cycle at a preset second time interval.

11. The device according to claim 10, wherein the first carrier signal phase measurement values comprise $\{\theta_0^m, \theta_1^m, \theta_2^m, \ldots\}$; wherein $\theta_i^m$ represents a first carrier signal phase measurement value at time $t_i$;

the second carrier signal phase measurement values comprise $\{\theta_0, \theta_1, \theta_2, \ldots\}$, wherein $\theta_i$ represents a second carrier signal phase measurement value at time $t_i$;

wherein in response to a phase change of carrier signals transmitted in a predefined first time interval being less than a preset value, the processor derives $\{\theta_0, \theta_1, \theta_2, \ldots\}$ from $\{\theta_0^m, \theta_1^m, \theta_2^m, \ldots\}$ by using an interpolation algorithm.

12. The device according to claim 11, wherein the preset value is 0.5 carrier signal transmission cycle, and corresponds to a carrier phase change value pi;

wherein the predefined first time interval refers to a time interval from a moment when carrier phase measurement values are obtained before phase lock of the phase-locked loop is lost to a moment when the phase-locked loop re-locks carrier signals to obtain carrier phase measurement values after the phase lock is lost, wherein a maximum value of the predefined first time interval is a sum of an uplink data transmission cycle and a downlink data transmission cycle, and a minimum value of the predefined first time interval is the uplink data transmission cycle.

13. The device according to claim 11, wherein the processor is configured to derive $\{\theta_0, \theta_1, \theta_2, \ldots\}$ using a formula of:

$$\theta_0 = \theta_0^m$$

$$\theta_{i+1} = \theta_i + \delta_i (i = 0, 1, \ldots)$$

-continued
$$\delta_i = \begin{cases} (\theta_{i+1}^m - \theta_i^m), & \text{if } |(\theta_{i+1}^m - \theta_i^m)| < \pi \\ (\theta_{i+1}^m - \theta_i^m) - 2\pi, & \text{if } (\theta_{i+1}^m - \theta_i^m) > \pi \\ (\theta_{i+1}^m - \theta_i^m) + 2\pi, & \text{if } (\theta_{i+1}^m - \theta_i^m) < -\pi \end{cases}.$$

14. The device according to claim 10, wherein the plurality of first carrier signal phase measurement values comprise: carrier signal phase measurement values obtained by the DL PRSs, sent on one or more DL OFDM, symbols with exceeding a preset bandwidth and a preset power, and carrier signal phase measurement values obtained by C-PRSs sent on other OFDM symbols in a same downlink transmission cycle;

or the plurality of first carrier signal phase measurement values comprise: a plurality of carrier signal phase measurement values obtained by DL PRSs sent on DL OFDMs with exceeding a preset bandwidth and a preset power many times in a same downlink transmission cycle at a preset second time interval;

wherein a phase change of carrier signals transmitted in the preset second time interval is less than 0.5 carrier signal transmission cycle, and corresponds to a carrier phase change value pi;

wherein in response to that two first carrier signal phase measurement values measured in a same downlink data transmission cycle being $\{\theta_{2i}^m, \theta_{2i+1}^m\}$, a time interval between two first carrier signal phase measurement values in $\{\theta_{2i}^m, \theta_{2i+1}^m\}$ being $\delta_1$, two first carrier signal phase measurement values measured at two time points $\{t_{2i+1}, t_{2i+2}\}$ across the uplink data transmission cycle being $\{\theta_{2i+1}^m, \theta_{2i+2}^m\}$, and a time interval between two first carrier signal phase measurement values in $\{\theta_{2i+1}^m, \theta_{2i+2}^m\}$ being $\delta_2$, wherein $i=0,1, 2, \ldots$, the processor is configured to determine the second carrier signal phase measurement values for positioning the terminal by an interpolation algorithm.

15. A device for determining information, comprises:
a memory configured to store program instructions;
a processor configured to read the memory to execute the program instructions to perform the method of claim 8.

* * * * *